US010038592B2

(12) United States Patent
Guntaka et al.

(10) Patent No.: US 10,038,592 B2
(45) Date of Patent: Jul. 31, 2018

(54) IDENTIFIER ASSIGNMENT TO A NEW SWITCH IN A SWITCH GROUP

(71) Applicant: BROCADE COMMUNICATIONS SYSTEMS, INC., San Jose, CA (US)

(72) Inventors: Vidyasagara R. Guntaka, San Jose, CA (US); Suresh Vobbilisetty, San Jose, CA (US); Manjunath A. G. Gowda, San Jose, CA (US); Pasupathi Duraiswamy, Milpitas, CA (US); Himanshu Varshney, San Jose, CA (US)

(73) Assignee: BROCADE COMMUNICATIONS SYSTEMS LLC, San Jose, CA (US)

( * ) Notice: Subject to any disclaimer, the term of this patent is extended or adjusted under 35 U.S.C. 154(b) by 41 days.

(21) Appl. No.: 14/660,803

(22) Filed: Mar. 17, 2015

(65) Prior Publication Data
US 2016/0277318 A1 Sep. 22, 2016

(51) Int. Cl.
*H04L 12/24* (2006.01)

(52) U.S. Cl.
CPC ...... *H04L 41/0813* (2013.01); *H04L 41/0233* (2013.01); *H04L 41/0843* (2013.01)

(58) Field of Classification Search
CPC .... H04L 12/4641; H04L 45/66; H04L 45/745
See application file for complete search history.

(56) References Cited

U.S. PATENT DOCUMENTS

| | | | |
|---|---|---|---|
| 829,529 A | 8/1906 | Keathley | |
| 5,390,173 A | 2/1995 | Spinney | |
| 5,802,278 A | 9/1998 | Isfeld | |
| 5,878,232 A | 3/1999 | Marimuthu | |
| 5,879,173 A | 3/1999 | Poplawski | |

(Continued)

FOREIGN PATENT DOCUMENTS

| | | |
|---|---|---|
| CN | 1735062 | 2/2006 |
| CN | 1777149 | 5/2006 |

(Continued)

OTHER PUBLICATIONS

Eastlake, D. et al., 'RBridges: TRILL Header Options', Dec. 24, 2009, pp. 1-17, TRILL Working Group.

(Continued)

*Primary Examiner* — Rina C Pancholi
(74) *Attorney, Agent, or Firm* — Shun Yao; Park, Vaughan, Fleming & Dowler LLP

(57) ABSTRACT

One embodiment of the present invention provides a switch. The switch includes a switch group module, a persistent storage module, and an allocation module. The switch group module maintains a membership in a switch group. The switch group includes a plurality of switches and operates as a single switch. The persistent storage module stores configuration information associated with the switch group in a data structure in a local persistent storage. The allocation module determines that a second switch is in a default mode and obtains a switch identifier from the persistent storage based on a switch media access control (MAC) address of the second switch. The allocation module then constructs a control message, which is destined for the second switch and includes the switch identifier and a switch group identifier of the switch group.

21 Claims, 24 Drawing Sheets

(56) References Cited

U.S. PATENT DOCUMENTS

| | | | |
|---|---|---|---|
| 5,959,968 | A | 9/1999 | Chin |
| 5,973,278 | A | 10/1999 | Wehrill, III |
| 5,983,278 | A | 11/1999 | Chong |
| 5,995,262 | A | 11/1999 | Hirota |
| 6,041,042 | A | 3/2000 | Bussiere |
| 6,085,238 | A | 7/2000 | Yuasa |
| 6,092,062 | A | 7/2000 | Lohman |
| 6,104,696 | A | 8/2000 | Kadambi |
| 6,122,639 | A * | 9/2000 | Babu ................ H04L 12/12 |
| 6,185,214 | B1 | 2/2001 | Schwartz |
| 6,185,241 | B1 | 2/2001 | Sun |
| 6,295,527 | B1 | 9/2001 | McCormack |
| 6,331,983 | B1 | 12/2001 | Haggerty |
| 6,438,106 | B1 | 8/2002 | Pillar |
| 6,498,781 | B1 | 12/2002 | Bass |
| 6,542,266 | B1 | 4/2003 | Phillips |
| 6,553,029 | B1 | 4/2003 | Alexander |
| 6,571,355 | B1 | 5/2003 | Linnell |
| 6,583,902 | B1 | 6/2003 | Yuen |
| 6,633,761 | B1 | 10/2003 | Singhal |
| 6,636,963 | B1 | 10/2003 | Stein |
| 6,771,610 | B1 | 8/2004 | Seaman |
| 6,870,840 | B1 | 3/2005 | Hill |
| 6,873,602 | B1 | 3/2005 | Ambe |
| 6,920,503 | B1 | 7/2005 | Nanji |
| 6,937,576 | B1 | 8/2005 | DiBenedetto |
| 6,956,824 | B2 | 10/2005 | Mark |
| 6,957,269 | B2 | 10/2005 | Williams |
| 6,975,581 | B1 | 12/2005 | Medina |
| 6,975,864 | B2 | 12/2005 | Singhal |
| 7,016,352 | B1 | 3/2006 | Chow |
| 7,061,877 | B1 | 6/2006 | Gummalla |
| 7,062,177 | B1 | 6/2006 | Grivna |
| 7,097,308 | B2 | 8/2006 | Kim et al. |
| 7,173,934 | B2 | 2/2007 | Lapuh |
| 7,197,308 | B2 | 3/2007 | Singhal |
| 7,206,288 | B2 | 4/2007 | Cometto |
| 7,310,664 | B1 | 12/2007 | Merchant |
| 7,313,637 | B2 | 12/2007 | Tanaka |
| 7,315,545 | B1 | 1/2008 | Chowdhury et al. |
| 7,316,031 | B2 | 1/2008 | Griffith |
| 7,330,897 | B2 | 2/2008 | Baldwin |
| 7,380,025 | B1 | 5/2008 | Riggins |
| 7,397,768 | B1 | 7/2008 | Betker |
| 7,397,794 | B1 | 7/2008 | Lacroute |
| 7,430,164 | B2 | 9/2008 | Bare |
| 7,453,888 | B2 | 11/2008 | Zabihi |
| 7,477,894 | B1 | 1/2009 | Sinha |
| 7,480,258 | B1 | 1/2009 | Shuen |
| 7,508,757 | B2 | 3/2009 | Ge |
| 7,558,195 | B1 | 7/2009 | Kuo |
| 7,558,273 | B1 | 7/2009 | Grosser |
| 7,571,447 | B2 | 8/2009 | Ally |
| 7,559,990 | B2 | 10/2009 | Mital |
| 7,599,901 | B2 | 10/2009 | Mital |
| 7,653,056 | B1 | 1/2010 | Dianes |
| 7,688,736 | B1 | 3/2010 | Walsh |
| 7,688,960 | B1 | 3/2010 | Aubuchon |
| 7,690,040 | B2 | 3/2010 | Frattura |
| 7,706,255 | B1 | 4/2010 | Kondrat et al. |
| 7,716,370 | B1 | 5/2010 | Devarapalli |
| 7,720,076 | B2 | 5/2010 | Dobbins |
| 7,729,296 | B1 | 6/2010 | Choudhary |
| 7,787,480 | B1 | 8/2010 | Mehta |
| 7,792,920 | B2 | 9/2010 | Istvan |
| 7,796,593 | B1 | 9/2010 | Ghosh |
| 7,801,021 | B1 | 9/2010 | Triantafillis |
| 7,808,992 | B2 | 10/2010 | Homchaudhuri |
| 7,836,332 | B2 | 11/2010 | Hara |
| 7,843,906 | B1 | 11/2010 | Chidambaram et al. |
| 7,843,907 | B1 | 11/2010 | Abou-Emara |
| 7,860,097 | B1 | 12/2010 | Lovett |
| 7,898,959 | B1 | 3/2011 | Arad |
| 7,912,091 | B1 | 3/2011 | Krishnan |
| 7,924,837 | B1 | 4/2011 | Shabtay |
| 7,937,438 | B1 | 5/2011 | Miller |
| 7,937,756 | B2 | 5/2011 | Kay |
| 7,945,941 | B2 | 5/2011 | Sinha |
| 7,949,638 | B1 | 5/2011 | Goodson |
| 7,957,386 | B1 | 6/2011 | Aggarwal |
| 8,018,938 | B1 | 9/2011 | Fromm |
| 8,027,035 | B2 | 9/2011 | Portolani |
| 8,027,354 | B1 | 9/2011 | Portolani |
| 8,054,832 | B1 | 11/2011 | Shukla |
| 8,068,442 | B1 | 11/2011 | Kompella |
| 8,078,704 | B2 | 12/2011 | Lee |
| 8,090,805 | B1 | 1/2012 | Chawla |
| 8,102,781 | B2 | 1/2012 | Smith |
| 8,102,791 | B2 | 1/2012 | Smith |
| 8,116,307 | B1 | 2/2012 | Thesayi |
| 8,125,928 | B2 | 2/2012 | Mehta |
| 8,134,922 | B2 | 3/2012 | Elangovan |
| 8,155,150 | B1 | 4/2012 | Chung |
| 8,160,063 | B2 | 4/2012 | Maltz |
| 8,160,080 | B1 | 4/2012 | Arad |
| 8,170,038 | B2 | 5/2012 | Belanger |
| 8,175,107 | B1 | 5/2012 | Yalagandula |
| 8,095,774 | B1 | 6/2012 | Lambeth |
| 8,194,674 | B1 | 6/2012 | Pagel |
| 8,195,774 | B2 | 6/2012 | Lambeth |
| 8,204,061 | B1 | 6/2012 | Sane |
| 8,213,313 | B1 | 7/2012 | Doiron |
| 8,213,336 | B2 | 7/2012 | Smith |
| 8,230,069 | B2 | 7/2012 | Korupolu |
| 8,124,906 | B2 | 8/2012 | Raman |
| 8,239,960 | B2 | 8/2012 | Frattura |
| 8,249,069 | B2 | 8/2012 | Raman |
| 8,270,401 | B1 | 9/2012 | Barnes |
| 8,295,291 | B1 | 10/2012 | Ramanathan |
| 8,295,921 | B2 | 10/2012 | Ramanathan |
| 8,301,686 | B1 | 10/2012 | Appajodu |
| 8,339,994 | B2 | 12/2012 | Gnanasekaran |
| 8,351,352 | B1 | 1/2013 | Eastlake |
| 8,369,335 | B2 | 2/2013 | Jha |
| 8,369,347 | B2 | 2/2013 | Xiong |
| 8,392,496 | B2 | 3/2013 | Linden |
| 8,451,717 | B2 | 5/2013 | Srikrishnan |
| 8,462,774 | B2 | 6/2013 | Page |
| 8,465,774 | B2 | 6/2013 | Page |
| 8,467,375 | B2 | 6/2013 | Blair |
| 8,520,595 | B2 | 8/2013 | Yadav |
| 8,553,710 | B1 | 10/2013 | White |
| 8,595,479 | B2 | 11/2013 | Radhakrishnan |
| 8,599,850 | B2 | 12/2013 | J ha |
| 8,599,864 | B2 | 12/2013 | Chung |
| 8,615,008 | B2 | 12/2013 | Natarajan |
| 8,619,788 | B1 | 12/2013 | Sankaran |
| 8,625,616 | B2 | 1/2014 | Vobbilisetty |
| 8,705,526 | B1 | 4/2014 | Hasan |
| 8,706,905 | B1 | 4/2014 | McGlaughlin |
| 8,717,895 | B2 | 5/2014 | Koponen |
| 8,724,456 | B1 | 5/2014 | Hong |
| 8,792,501 | B1 | 7/2014 | Rustagi |
| 8,798,045 | B1 | 8/2014 | Aybay |
| 8,798,055 | B1 | 8/2014 | An |
| 8,804,732 | B1 | 8/2014 | Hepting |
| 8,804,736 | B1 | 8/2014 | Drake |
| 8,806,031 | B1 | 8/2014 | Kondur |
| 8,826,385 | B2 | 9/2014 | Congdon |
| 8,918,631 | B1 | 12/2014 | Kumar |
| 8,937,865 | B1 | 1/2015 | Kumar |
| 8,948,181 | B2 | 2/2015 | Kapadia |
| 8,971,173 | B1 | 3/2015 | Choudhury |
| 8,995,272 | B2 | 3/2015 | Agarwal |
| 9,019,976 | B2 | 4/2015 | Gupta |
| 9,178,793 | B1 | 11/2015 | Marlow |
| 9,231,890 | B2 | 1/2016 | Vobbilisetty |
| 9,350,680 | B2 | 5/2016 | Thayalan |
| 9,401,818 | B2 | 7/2016 | Venkatesh |
| 9,438,447 | B2 | 9/2016 | Basso |
| 9,524,173 | B2 | 12/2016 | Guntaka |
| 9,626,255 | B2 | 4/2017 | Guntaka |
| 9,628,407 | B2 | 4/2017 | Guntaka |
| 2001/0005527 | A1 | 6/2001 | Vaeth |

(56) References Cited

U.S. PATENT DOCUMENTS

| | | |
|---|---|---|
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Holmgren |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0093254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Melman |
| 2008/0225853 A1 | 9/2008 | Melman |
| 2008/0228897 A1 | 9/2008 | Ko |
| 2008/0240129 A1 | 10/2008 | Elmeleegy |
| 2008/0253380 A1 | 10/2008 | Cazares |

(56) References Cited

U.S. PATENT DOCUMENTS

| | | |
|---|---|---|
| 2008/0267179 A1 | 10/2008 | Lavigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Shelly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hares |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Shukla |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Gray |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | Shah |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Xiong |
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | Van |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |

(56) References Cited

U.S. PATENT DOCUMENTS

| | | |
|---|---|---|
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Norbert Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0194914 A1 | 8/2013 | Agarwal |
| 2013/0201992 A1 | 8/2013 | Masaki |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1* | 11/2013 | Udutha .............. H04L 12/4641 370/242 |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1* | 12/2013 | Stiekes .............. H04L 49/356 370/352 |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0192804 A1 | 7/2014 | Ghanwani |
| 2014/0241147 A1 | 8/2014 | Rajagopalan |
| 2014/0258446 A1 | 9/2014 | Bursell |
| 2014/0269701 A1 | 9/2014 | Kaushik |

(56) References Cited

U.S. PATENT DOCUMENTS

| | | | |
|---|---|---|---|
| 2014/0269720 A1 | 9/2014 | Srinivasan | |
| 2014/0269733 A1 | 9/2014 | Venkatesh | |
| 2014/0298091 A1 | 10/2014 | Carlen | |
| 2014/0355477 A1* | 12/2014 | Velayudhan | H04L 41/0806 370/254 |
| 2014/0362854 A1 | 12/2014 | Addanki | |
| 2014/0362859 A1 | 12/2014 | Addanki | |
| 2015/0009992 A1 | 1/2015 | Zhang | |
| 2015/0010007 A1 | 1/2015 | Matsuhira | |
| 2015/0016300 A1 | 1/2015 | Devireddy | |
| 2015/0030031 A1 | 1/2015 | Zhou | |
| 2015/0092593 A1 | 4/2015 | Kompella | |
| 2015/0110111 A1 | 4/2015 | Song | |
| 2015/0110487 A1 | 4/2015 | Fenkes | |
| 2015/0117256 A1 | 4/2015 | Sabaa | |
| 2015/0127618 A1 | 5/2015 | Alberti | |
| 2015/0139234 A1 | 5/2015 | Hu | |
| 2015/0143369 A1 | 5/2015 | Zheng | |
| 2015/0172098 A1 | 6/2015 | Agarwal | |
| 2015/0188753 A1 | 7/2015 | Anumala | |
| 2015/0195093 A1 | 7/2015 | Ramasubramani | |
| 2015/0222506 A1 | 8/2015 | Kizhakkiniyil | |
| 2015/0248298 A1 | 9/2015 | Gavrilov | |
| 2015/0263991 A1 | 9/2015 | MacChiano | |
| 2015/0281066 A1 | 10/2015 | Koley | |
| 2015/0301901 A1 | 10/2015 | Rath | |
| 2015/0347468 A1 | 12/2015 | Bester | |
| 2016/0072899 A1 | 3/2016 | Tung | |
| 2016/0087885 A1 | 3/2016 | Tripathi | |
| 2016/0139939 A1 | 5/2016 | Bosch | |
| 2016/0182458 A1 | 6/2016 | Shatzkamer | |
| 2016/0344640 A1 | 11/2016 | Sloderlund | |
| 2017/0026197 A1 | 1/2017 | Venkatesh | |
| 2017/0097841 A1 | 4/2017 | Chang | |

FOREIGN PATENT DOCUMENTS

| | | | |
|---|---|---|---|
| CN | 101064682 | 10/2007 | |
| CN | 101459618 | 6/2009 | |
| CN | 101471899 | 7/2009 | |
| CN | 101548511 | 9/2009 | |
| CN | 101645880 | 2/2010 | |
| CN | 102098237 | 6/2011 | |
| CN | 102148749 | 8/2011 | |
| CN | 102301663 | 12/2011 | |
| CN | 102349268 | 2/2012 | |
| CN | 102378176 | 3/2012 | |
| CN | 102404181 | 4/2012 | |
| CN | 102415065 | 4/2012 | |
| CN | 102415065 A | 4/2012 | |
| CN | 102801599 | 11/2012 | |
| CN | 102801599 A | 11/2012 | |
| CN | 102088388 | 4/2014 | |
| EP | 0579567 | 5/1993 | |
| EP | 0579567 A2 | 1/1994 | |
| EP | 0993156 | 4/2000 | |
| EP | 0993156 A2 | 12/2000 | |
| EP | 1398920 | 3/2004 | |
| EP | 1398920 A2 | 3/2004 | |
| EP | 2001167 A1 | 8/2007 | |
| EP | 1916807 A2 | 4/2008 | |
| EP | 2854352 | 4/2015 | |
| EP | 2874359 | 5/2015 | |
| WO | 2008056838 | 5/2008 | |
| WO | 2009042919 | 4/2009 | |
| WO | 2010111142 | 9/2010 | |
| WO | 2010111142 A1 | 9/2010 | |
| WO | 2011132568 | 10/2011 | |
| WO | 2011140028 | 11/2011 | |
| WO | 2011140028 A1 | 11/2011 | |
| WO | WO 2011140028 A1 * | 11/2011 | H04L 49/70 |
| WO | 2012033663 | 3/2012 | |
| WO | 2012093429 | 7/2012 | |
| WO | 2014031781 | 2/2014 | |

OTHER PUBLICATIONS

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

'An Introduction to Brocade VCS Fabric Technology', BROCADE white paper, http://community.brocade.com/docs/DOC-2954, Dec. 3, 2012.

'Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

U.S. Appl. No. 13/030,806 Office Action dated Dec. 3, 2012.

Office Action dated Apr. 9, 2014, U.S. Appl. No. 13/092,724, filed Apr. 22, 2011.

Office action dated Jan. 10, 2014, U.S. Appl. No. 13/092,580, filed Apr. 22, 2011.

Office action dated Jan. 16, 2014, U.S. Appl. No. 13/042,259, filed Mar. 7, 2011.

Office action dated Jul. 31, 2013, U.S. Appl. No. 13/042,259, filed Mar. 7, 2011.

Office Action dated Mar. 14, 2014, U.S. Appl. No. 13/092,460, filed Apr. 22, 2011.

Office Action dated Mar. 26, 2014, U.S. Appl. No. 13/092,701, filed Apr. 22, 2011.

Office Action dated Apr. 9, 2014, U.S. Appl. No. 13/092,752, filed Apr. 22, 2011.

Office action dated Jan. 6, 2014, U.S. Appl. No. 13/092,877, filed Apr. 22, 2011.

Office action dated Oct. 2, 2013, U.S. Appl. No. 13/044,326, filed Mar. 9, 2011.

Office action dated Dec. 2, 2013, U.S. Appl. No. 13/184,526, filed Jul. 16, 2011.

Office action dated Nov. 29, 2013, U.S. Appl. No. 13/092,873, filed Apr. 22, 2011.

Office Action dated Mar. 6, 2014, U.S. Appl. No. 13/425,238, filed Mar. 20, 2012.

Office action dated Nov. 12, 2013, U.S. Appl. No. 13/312,903, filed Dec. 6, 2011.

Office Action dated Jun. 18, 2014, U.S. Appl. No. 13/440,861, filed Apr. 5, 2012.

Office Action dated Feb. 28, 2014, U.S. Appl. No. 13/351,513, filed Jan. 17, 2012.

Office Action dated May 9, 2014, U.S. Appl. No. 13/484,072, filed May 30, 2012.

Office Action dated May 14, 2014, U.S. Appl. No. 13/533,843, filed Jun. 26, 2012.

Office Action dated Feb. 20, 2014, U.S. Appl. No. 13/598,204, filed Aug. 29, 2012.

Office Action dated Jun. 6, 2014, U.S. Appl. No. 13/669,357, filed Nov. 5, 2012.

Brocade, 'Brocade Fabrics OS (FOS) 6.2 Virtual Fabrics Feature Frequently Asked Questions', pp. 1-6, 2009 Brocade Communications Systems, Inc.

Brocade, 'FastIron and TurboIron 24x Configuration Guide', Feb. 16, 2010.

Brocade, 'The Effortless Network: Hyperedge Technology for the Campus LAN' 2012.

Brocade 'Brocade Unveils'The Effortless Network, http://newsroom.brocade.com/press-releases/brocade-unveils-the-effortless-network-nasdaq-brcd-0859535, 2012.

Christensen, M. et al., 'Considerations for Internet Group Management Protocol (IGMP) and Multicast Listener Discovery (MLD) Snooping Switches', May 2006.

FastIron Configuration Guide Supporting Ironware Software Release 07.0.00, Dec. 18, 2009.

Foundary FastIron Configuration Guide, Software Release FSX 04.2.00b, Software Release FWS 04.3.00, Software Release FGS 05.0.00a, Sep. 2008.

Huang, Nen-Fu et al., 'An Effective Spanning Tree Algorithm for a Bridged LAN', Mar. 16, 1992.

(56) References Cited

OTHER PUBLICATIONS

Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem -statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/533,843, filed Jun. 26, 2012, dated Oct. 21, 2013.
Office Action for U.S. Appl. No. 13/092,887, dated Jan. 6, 2014.
Perlman, Radia et al., 'Challenges and Opportunities in the Design of TRILL: a Routed layer 2 Technology', 2009.
Perlman, Radia et al., 'RBridges: Base Protocol Specification; Draft-ietf-trill-rbridge-protocol-16.txt', Mar. 3, 2010, pp. 1-117.
S. Nadas et al., 'Virtual Router Redundancy Protocol (VRRP) Version 3 for IPv4 IPv6', Internet Engineering Task Force, Mar. 2010.
Zhai F. Hu et al. 'RBridge: Pseudo-Nickname; draft-hu-trill-pseudonode-nickname-02.txt', May 15, 2012.
'RBridges: Base Protocol Specification', IETF Draft, Perlman et al., Jun. 26, 2009.
Office action dated Aug. 29, 2014, U.S. Appl. No. 13/042,259, filed Mar. 7, 2011.
Office action dated Aug. 21, 2014, U.S. Appl. No. 13/184,526, filed Jul. 16, 2011.
Brocade 'An Introduction to Brocade VCS Fabric Technology', Dec. 3, 2012.
Office Action for U.S. Appl. No. 13/042,259, filed Mar. 7, 2011, from Jaroenchonwanit, Bunjob, dated Jan. 16, 2014.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.

(56) References Cited

OTHER PUBLICATIONS

Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Lapuh, Roger et al., 'Split Multi-link Trunking (SMLT) draft-lapuh-network-smlt-08', Jan. 2009.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.

Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specification Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, ED K. et al., 'Virtual Private LAN Service (VPLS) Using BGP for Auto-Discovery and Signaling' Jan. 2007.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.

(56) References Cited

OTHER PUBLICATIONS

Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/425,238, filed Mar. 20, 2012, dated Mar. 12, 2015.

Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.

* cited by examiner

XML DEFINITION
— 400

<ManagedObject NAME = "Node" >

<ATTRIBUTE NAME = "NodeID" TYPE = "STRING" />

----

<ATTRIBUTE NAME = "getsPower" TYPE = "1-1-Association" RELATEDTO = "PowerSource"/>

----

<ATTRIBUTE NAME = "includes" TYPE = "1-M-Association" RELATEDTO = "LineCard"/>

----

< ManagedObject />

FIG. 4B

IDENTIFIER ASSIGNMENT TO A NEW SWITCH IN A SWITCH GROUP

RELATED APPLICATION

The present disclosure is related to U.S. Pat. No. 8,867,552, titled "Virtual Cluster Switching," by inventors Suresh Vobbilisetty and Dilip Chatwani, issued 21 Oct. 2014; and U.S. patent application Ser. No. 14/512,268, titled "Distributed Configuration Management in a Switch Group," by inventors Vidyasagara R. Guntaka, Suresh Vobbilisetty, Manjunath A. G. Gowda, and Himanshu Varshney, filed 10 Oct. 2014, the disclosures of which are incorporated by reference herein.

BACKGROUND

Field

The present disclosure relates to communication networks. More specifically, the present disclosure relates to a method for identifier assignment in scalable systems.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch. However, a user (e.g., a network administrator) may decide to retain control over which switch joins which fabric switch and how their respective switch identifier is assigned. As a result, when a new switch joins the fabric switch, the user can configure the identifiers for the switch, which allows the switch to join the fabric switch as a new member switch. This process of identifier assignment can be tedious and error-prone.

Meanwhile, a switch, an individual or a member switch of a fabric switch, continues to store more configuration information as the switch participates in network virtualizations, partitions, and switch groups, and operates on a plurality of network protocols of different network layers. This configuration needs to be applied to the switch when the switch powers up, and thus, should be persistent. A switch typically stores such configuration information in a local storage in an unstructured format. The switch reads the information during booting up (i.e., powering up), and loads the information into memory. Managing persistent storage in unstructured format is inefficient and requires runtime structuring.

While persistent storage brings many desirable features to a fabric switch, some issues remain unsolved in efficiently managing joining of a new switch.

SUMMARY

One embodiment of the present invention provides a switch. The switch includes a switch group module, a persistent storage module, and an allocation module. The switch group module maintains a membership in a switch group. The switch group includes a plurality of switches and operates as a single switch. The persistent storage module stores configuration information associated with the switch group in a data structure in a local persistent storage. The allocation module determines that a second switch is in a default mode and obtains a switch identifier from the persistent storage based on a switch media access control (MAC) address of the second switch. The allocation module then constructs a control message, which is destined for the second switch and includes the switch identifier and a switch group identifier of the switch group.

In a variation on this embodiment, the switch also includes an identifier management module which maintains a first mapping between the switch MAC address and the switch identifier in the persistent storage.

In a further variation, the identifier management module creates the first mapping based on one or more of: a user input and a notification message from another member switch of the switch group.

In a further variation, the identifier management module maintains a second mapping between the switch MAC address and the switch group identifier.

In a variation on this embodiment, the allocation module identifies the switch MAC address from a default mode message from the second switch. The default mode message comprises an indicator indicating that the second switch is in a default mode.

In a further variation, the indicator is one or more of: (i) a default value of a switch group identifier, (ii) a default value of a switch identifier, (iii) a default value of a MAC address, and (iv) an indicator variable.

In a variation on this embodiment, the first message also includes a virtual local area network (VLAN) configuration.

In a variation on this embodiment, the switch identifier is one or more of: (i) a Transparent Interconnection of Lots of Links (TRILL) routing bridge (RBridge) identifier, (ii) an Internet Protocol (IP) address, and (iii) a MAC address.

In a variation on this embodiment, the persistent storage is an object relational database, and a data structure in the persistent storage is a table in the database.

In a variation on this embodiment, the switch group is an Ethernet fabric switch, wherein the plurality of switches included the switch group operate as a single Ethernet switch.

BRIEF DESCRIPTION OF THE FIGURES

FIG. 4B illustrates an exemplary Extensible Markup Language (XML) representation of a class corresponding to a switch with a persistent storage framework, in accordance with an embodiment of the present invention.

In the figures, like reference numerals refer to the same figure elements.

DETAILED DESCRIPTION

Figure 1A:
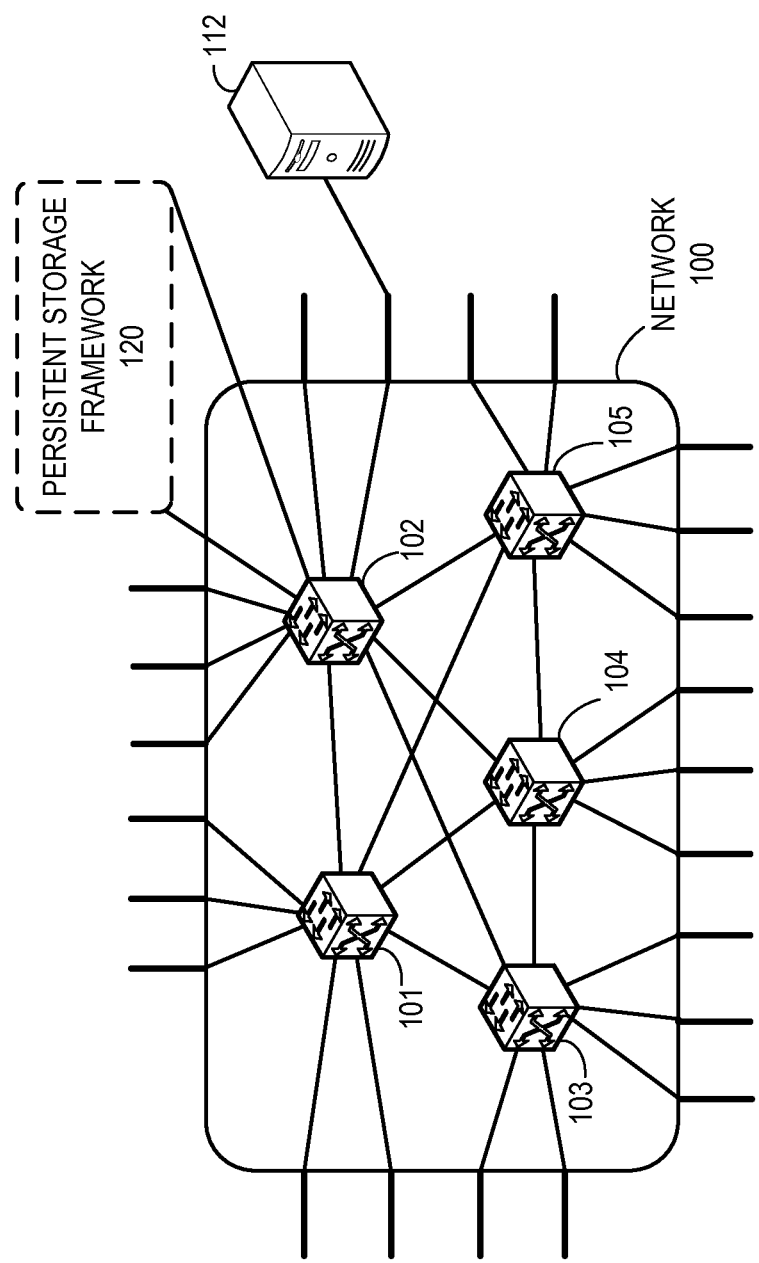
FIG. 1A illustrates an exemplary network with persistent storage framework support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of automatically assigning identifiers to a new switch in a switch group is solved by pre-configuring the identifiers for the new switch. This new switch is not a member of the switch group yet. Upon detecting this new switch, a current member switch provides these identifiers to the news switch, which, in turn, configures itself with the provided identifiers.

A switch can be configured by logging in to the switch (e.g., via telnet) or via a console port (e.g., an RS-232 port). Such configuration can be related to network virtualizations, partitions, and switch groups, and a plurality of network protocols of different network layers. The attribute values (e.g., parameters) of the configuration information are stored in a local persistent storage and applied to the switch (e.g., loaded to the switch modules). In some embodiments, a switch can be in a switch group (e.g., a fabric switch). Configuration and state information of a switch group can be stored in a persistent storage of a respective member switch of the switch group. One of the switches in the switch group is elected as a principal switch, which manages and distributes configuration information in the switch group. The rest of the switches of the switch group can be referred to as managed switches. When a user accesses this principal switch, the principal switch allows the user to configure the global configuration information of the switch group. The principal switch, in turn, synchronizes that global configuration information with a respective managed switch. Furthermore, the principal switch also allows the user to configure a respective managed switch in the switch group. The principal switch, in turn, synchronizes that local configuration information to that managed switch.

With existing technologies, a user (e.g., a network administrator) may decide to retain control over which switch joins which switch group and how a respective identifier of a switch is assigned. As a result, when a new switch joins a switch group, the user can configure the identifiers for the switch. This process can be tedious and error-prone. Furthermore, the switch only becomes available for configuration when that switch is physically available for configuration. In other words, only when a vendor delivers the switch to a customer, the user (e.g., the network administrator of that customer) may configure the switch. If the switches become available incrementally, the user has to configure a switch individually when it becomes available.

To solve this problem, the principal switch of the switch group pre-allocates the identifiers for the new switch. This new switch can be in a default mode (e.g., a bare-bone switch, which has not been configured yet, such as a new switch delivered from a vendor). Typically, a media access control (MAC) address is assigned to a switch. This MAC address can be referred to as a switch MAC address and can be distinct from a MAC address of a port of the switch. This switch MAC address is typically available before the switch is delivered. The principal switch pre-configures a switch identifier for the new switch, maintains a mapping between the switch MAC address and the switch identifier (e.g., in the local persistent storage), and distributes this mapping to a respective managed switch of the switch group via a distributed commit.

A respective switch of the switch group receives the mapping and stores it in its local persistent storage. Upon detecting the new switch (e.g., based on a link discovery protocol), a current switch of the switch group assigns the switch identifier and a switch group identifier, which identifies the switch group, to the new switch. The new switch configures itself with the received switch identifier and the switch group identifier and initiates the joining process to the switch group. In this way, a switch group can facilitate automatic assignment of identifiers to a new switch.

However, the user may want to retain control over how a switch identifier is assigned to a switch of the switch group. In some embodiments, the user can provide the switch identifier to the principal switch. The user can create the mapping between the switch MAC address and the switch identifier and provide that mapping to any of the switches of the switch group. That switch, in turn, provides that mapping to the principal switch. The principal switch then performs a distributed commit for the mapping in the switch group. In this way, a respective switch of the switch group receives the mapping and stores the mapping in the local persistent storage. It should be noted that this distributed commit may not include applying to the switch modules of a switch.

Figure 6A:
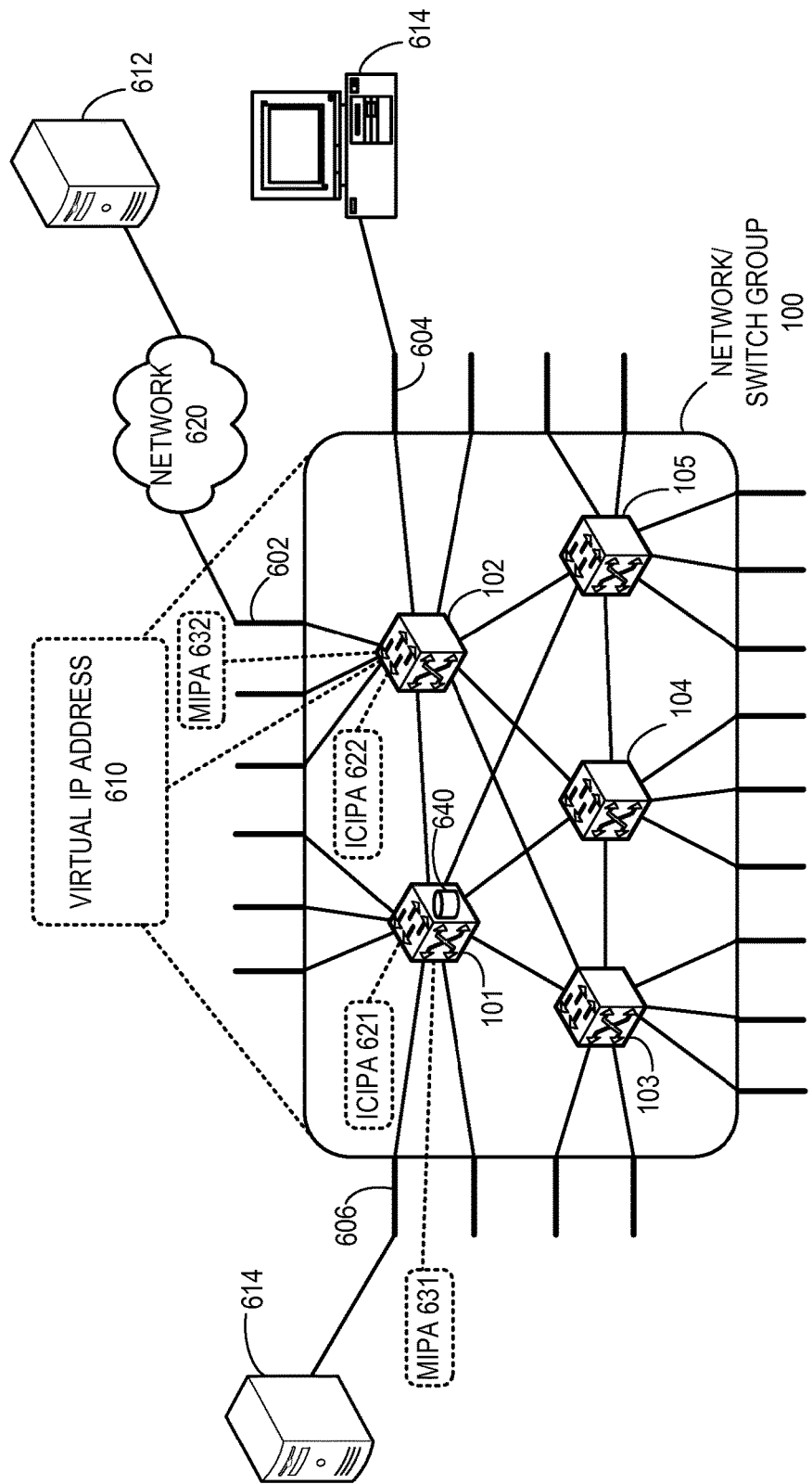
FIG. 6A illustrates an exemplary switch group with persistent storage framework and distributed configuration management support, in accordance with an embodiment of the present invention.
Figure 6B:
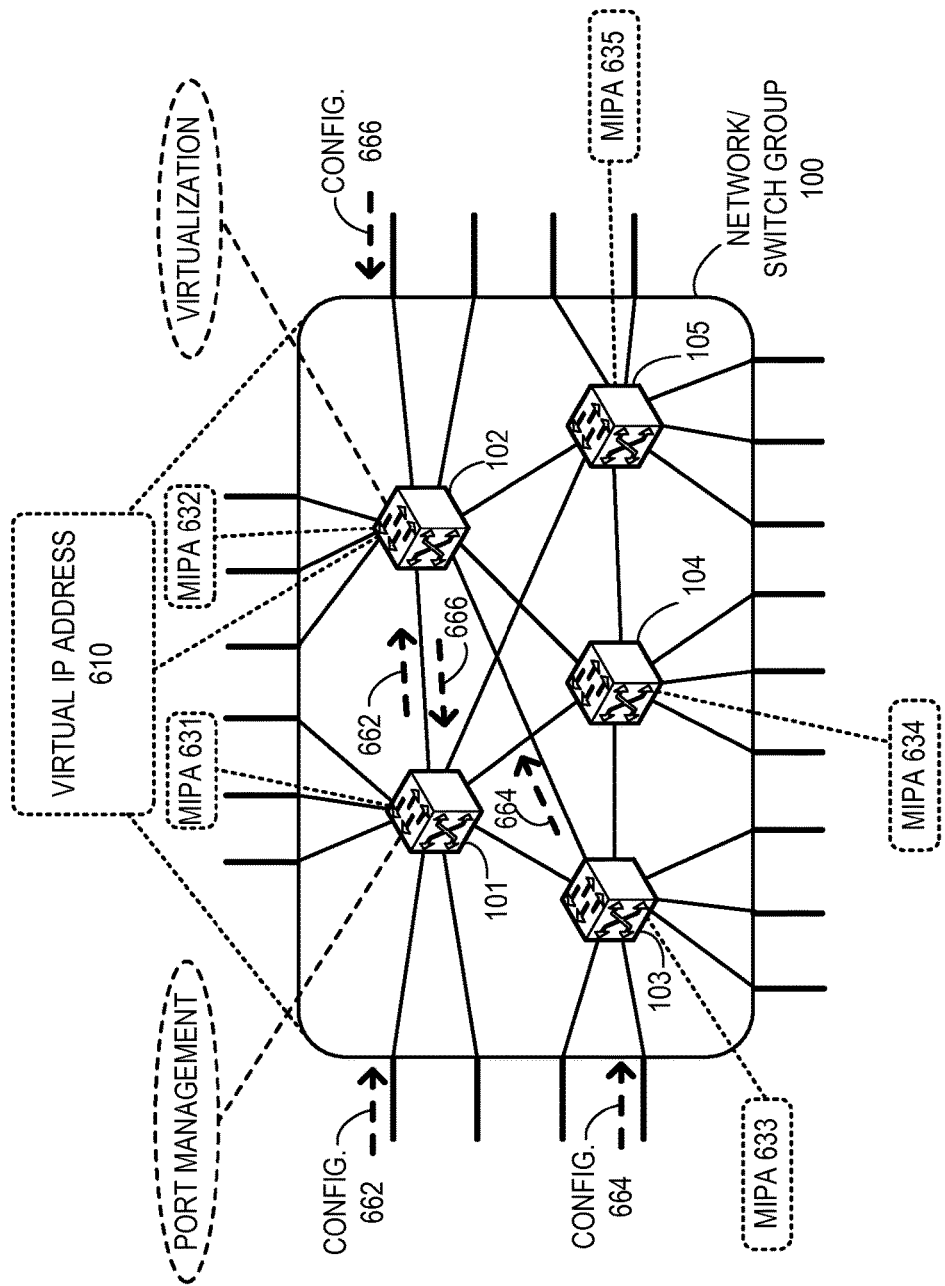
FIG. 6B illustrates an exemplary switch group with multi-input and multi-principal switch support, in accordance with an embodiment of the present invention.
Figure 7:
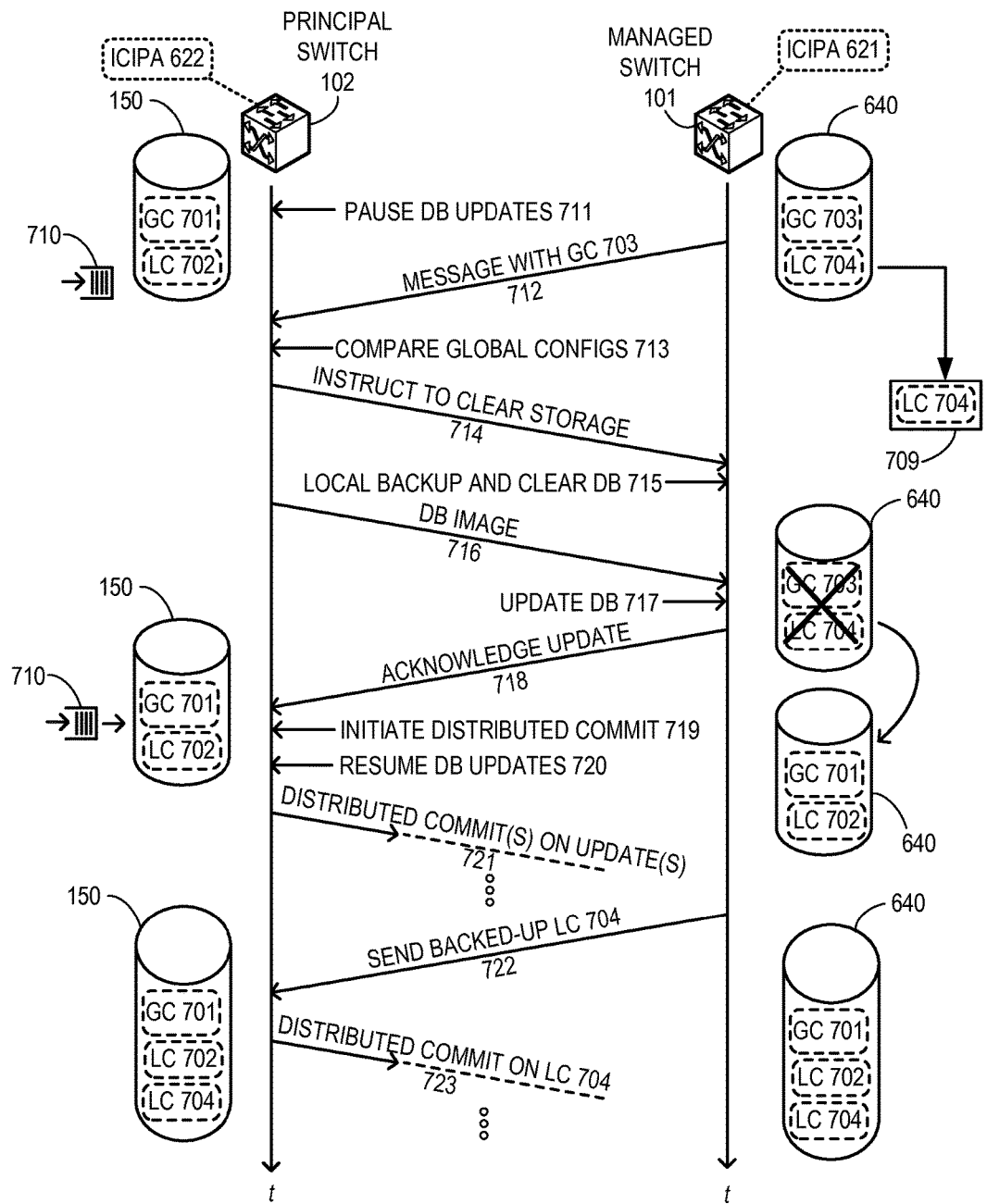
FIG. 7 illustrates an exemplary distributed configuration management, in accordance with an embodiment of the present invention.

In some embodiments, a switch in the switch group can be referred to as a member switch. A respective member switch of the switch group can be equipped with a persistent storage framework which stores the configuration information in a local persistent storage. Such a persistent storage can be an object relational database. The configuration information is loaded from this persistent storage to the switch (or device) modules (e.g., the application-specific integrated circuit (ASIC) chips of the switch). In this disclosure, the description in conjunction with FIGS. 1-5 is associated with persistent storage in the switch; the description in conjunction with FIGS. 6-7 is associated with distributed configuration management in a switch group; and the description in conjunction with FIG. 8 and onward provides more details on a multi-fabric manager.

In some embodiments, the framework supports Model Driven Architecture (MDA), Object Oriented Programming (OOP), and/or Model/View/Controller (MVC) design patterns to facilitate modular development and operation of the units. The framework can also support class frameworks based on Unified Modeling Language (UML). Upon receiving class models (e.g., class name, attributes, and methods) and their relations based on UML, the framework automatically generates the corresponding code, thereby ensuring structure in the operational units of a switch. In some embodiments, the class models are expressed in YANG, which is a data modeling language used to model configuration and state data manipulated by the Network Configuration Protocol (NETCONF).

Since the units operate on the framework in a modular way, their associated attribute values can be stored in a persistent storage in a structured way. In some embodiments, the framework uses Object-Relational Mapping to store the attribute values of the units in a structured way in an object relational database. The framework allows different classes to be defined for a unit based on MDA, OOP, and/or MVC design patterns. The framework then seamlessly maps a respective class to a database table and vice-versa. Furthermore, the framework also seamlessly represents the relationships among the classes (e.g., an association or a composition) in the database. As a result, when a unit becomes operational on the switch, attribute values associated with a respective class in that unit is automatically loaded from the database. Moreover, if a class changes (e.g., a new attribute or a new relationship), the framework seamlessly incorporates that change into the database.

In some embodiments, the switch group can be a fabric switch. The switch can include one or more units which allow the switch to join and operate as a member switch of the fabric switch. These units can also run on the framework. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

It should also be noted that a fabric switch is distinct from a virtual local area network (VLAN). A fabric switch can accommodate a plurality of VLANs. A VLAN is typically identified by a VLAN tag. In contrast, the fabric switch is identified a fabric identifier (e.g., a VCS identifier), which is assigned to the fabric switch. A respective member switch of the fabric switch is associated with the fabric identifier. Furthermore, when a member switch of a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared among a respective member switch of the fabric switch.

The term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "end device" can refer to any device external to a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch. An end device hosting one or more virtual machines can be referred to as a host machine. In this disclosure, the terms "end device" and "host machine" are used interchangeably.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port on a fabric switch which exchanges data frames with a network device outside of the fabric switch (i.e., an edge port is not used for exchanging data frames with another member switch of a fabric switch). The term "inter-switch port" refers to a port which sends/receives data frames among member switches of a fabric switch. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

Network Architecture

FIG. 1A illustrates an exemplary network with persistent storage framework support, in accordance with an embodiment of the present invention. As illustrated in FIG. 1A, a network 100 includes switches 101, 102, 103, 104, and 105. An end device 112 is coupled to switch 102. In some embodiments, end device 112 is a host machine, hosting one or more virtual machines. End device 112 can include a hypervisor, which runs one or more virtual machines. End device 112 can be equipped with a Network Interface Card (NIC) with one or more ports. End device 112 couples to switch 102 via the ports of the NIC.

In some embodiments, network 100 is a TRILL network and a respective switch of network 100, such as switch 102, is a TRILL RBridge. Under such a scenario, communication among the switches in network 100 is based on the TRILL protocol. For example, upon receiving an Ethernet frame from end device 112, switch 102 encapsulates the received Ethernet frame in a TRILL header and forwards the TRILL packet. In some further embodiments, network 100 is an IP network and a respective switch of network 100, such as switch 102, is an IP-capable switch, which calculates and maintains a local IP routing table (e.g., a routing information base or RIB), and is capable of forwarding packets based on its IP addresses. Under such a scenario, communication among the switches in network 100 is based on IP. For example, upon receiving an Ethernet frame from end device 112, switch 102 encapsulates the received Ethernet frame in an IP header and forwards the IP packet.

In some embodiments, network 100 is a fabric switch (under such a scenario, network 100 can also be referred to as fabric switch 100). Fabric switch 100 is assigned with a fabric switch identifier. A respective member switch of fabric switch 100 is associated with that fabric switch identifier. This allows the member switch to indicate that it is a member of fabric switch 100. In some embodiments, whenever a new member switch joins fabric switch 100, the fabric switch identifier is automatically associated with that new member switch. Furthermore, a respective member switch of fabric switch 100 is assigned a switch identifier (e.g., an RBridge identifier, a Fibre Channel (FC) domain ID (identifier), or an IP address). This switch identifier identifies the member switch in fabric switch 100.

Switches in fabric switch 100 use edge ports to communicate with end devices (e.g., non-member switches) and inter-switch ports to communicate with other member switches. For example, switch 102 is coupled to end device 112 via an edge port and to switches 101, 103, 104, and 105 via inter-switch ports and one or more links. Data communication via an edge port can be based on Ethernet and via an inter-switch port can be based on the IP and/or TRILL protocol. It should be noted that control message exchange via inter-switch ports can be based on a different protocol (e.g., the IP or FC protocol).

A switch, such as switch 102, stores configuration information needed to operate switch 102 as an individual switch or as a member switch of fabric switch 100. Furthermore, switch 102 can participate in various services and operations, such as network virtualization (e.g., a virtual local area networks (VLAN)), switch partitioning, and link aggregations (e.g., a multi-chassis trunk). Furthermore, switch 102 operates on a plurality of network protocols of different network layers (e.g., Ethernet, TRILL, FC, and IP). As a result, switch 102 runs protocol daemons for each of these protocols. However, to incorporate the services and operations, the protocol daemons need to be directly modified, which can lead to conflicts and errors.

Furthermore, each of the operations, services, and the protocols is associated with one or more attributes. These attribute values (e.g., parameters) is typically applied to switch 102 when switch 102 powers up. As a result, these attribute values are stored in a persistent storage so that these values can be retrieved even when switch 102 is powered off or restarts. With existing technologies, switch 102 may store such attribute values in a local storage in an unstructured format (e.g., a string comprising the attribute values). During the boot up process, switch 102 reads and parses the attribute values in the unstructured format, and loads the attribute values into switch memory. Managing persistent storage in unstructured format is inefficient and requires runtime structuring.

To solve this problem, switch 102 is equipped with a persistent storage framework 120 which facilitates structured persistent storage to the attribute values associated with different operational units of switch 102 (e.g., modules and services of switch 102). It should be noted that other switches of network 100 can be equipped with a persistent storage framework and support persistent storage. In some embodiments, some switch of network 100 may not be equipped with a persistent storage framework. Different units of switch 102, each of which facilitates an aspect of switch 102's operations, operate on framework 120 in a structured and modular way. This allows a respective unit to be independently introduced to framework 120 in such a way that the unit can interoperate with other units (e.g., modules and services) of switch 102. Framework 120 supports MDA, OOP, and/or MVC design patterns to facilitate structured development and operation of the units in switch 102.

Since the units operate on framework 120 in a structured way, their associated attribute values can be stored in a persistent storage in a structured way. In some embodiments, framework 120 uses Object-Relational Mapping to store the attribute values of the units in a structured way in an object relational database. Framework 120 allows different classes to be defined for a unit during development based on MDA, OOP, and/or MVC design patterns. Framework 120 supports class models based on UML. In some embodiments, class models are expressed in YANG, which is a data modeling language used to model configuration and state data manipulated by NETCONF. Upon receiving class models (e.g., class name, attributes, and methods) and their relationships based on UML, framework 120 automatically generates the corresponding code, thereby ensuring structure in the operational units of switch 102.

Framework 120 seamlessly maps a respective class to a database table and vice-versa. Furthermore, framework 120 also seamlessly represents the relations among the classes (e.g., an association or a composition) in the database. As a result, when a unit becomes operational on switch 102 (e.g., when switch 102 powers up), attribute values associated with a respective class in that unit is automatically loaded from the database. Moreover, if a class changes (e.g., a new attribute or a new relationship), framework 120 seamlessly incorporates that change into the database.

Persistent Storage Framework

Figure 1B:
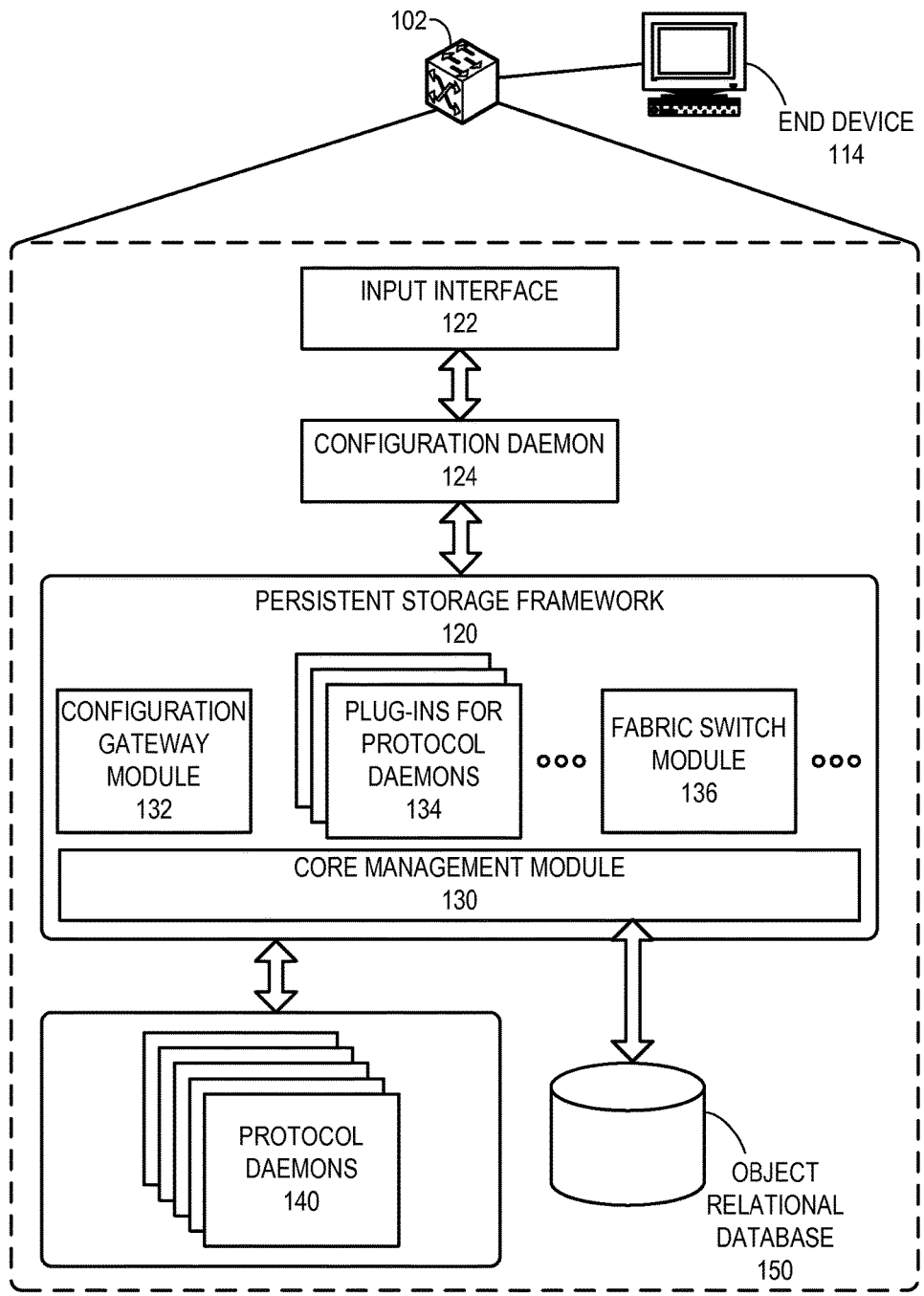
FIG. 1B illustrates an exemplary persistent storage framework support in a switch, in accordance with an embodiment of the present invention.

FIG. 1B illustrates an exemplary persistent storage framework in a switch, in accordance with an embodiment of the present invention. In this example, persistent storage framework 120 of switch 102 provides structured persistent storage to the operational units of switch 102. In some embodiments, switch 102 is coupled to an end device 114, which can operate as an administrative terminal for switch 102. Switch 102 runs one or more protocol daemons 140. For example, switch 102 can run respective protocol daemons for Ethernet, TRILL, FC, and IP. A protocol daemon facilitates the services and operations of a corresponding protocol for switch 102.

Switch 102 further includes an input interface 122 to switch 102 (e.g., a graphical user interface (GUI) and/or a command line interface (CLI). A user can access input interface 122 via end device 114. The user can obtain information from and provide instruction to switch 102 via input interface 122. Switch 102 also includes a configuration daemon 124, which can receive configuration (e.g., an IP address) for switch 102 from end device 114 (e.g., from a user) via input interface 122. Configuration daemon 124 provides this configuration information to framework 120. Framework 120 can include a configuration daemon gateway module 132, which communicates with configuration daemon 124. Upon receiving the configuration information, framework 120 can identify different attribute values (e.g., a VLAN identifier) and assigns those attribute values to the corresponding attribute of an operational unit of switch 102.

On the other hand, switch 102 can receive an instruction via input interface 122 to provide its configuration associated with one or more units. For example, a user can issue a command to show the IP addresses assigned to switch 102 from end device 114. Input interface 122 provides this instruction to configuration daemon 124, which in turn, sends an internal command to configuration daemon gateway module 132 for the requested configuration information. In response, framework 120 identifies the attributes (e.g., IP addresses) associated with the requested configuration information and obtains the corresponding attribute values (e.g., assigned IP addresses to switch 120) from a persistent storage. Configuration daemon gateway module 132 provides the obtained attribute values to configuration daemon 124. Upon receiving the attribute values, configuration daemon 124 provides the attribute values as the requested configuration information to input interface 122, which in turn, provides the configuration information to end device 114.

Framework 120 includes a core management module 130, which facilitates structured persistent storage to the attribute values associated with different operational units of switch 102 (e.g., modules and services of switch 102). Different units of switch 102 operate on core management module 130 in a structured way. This allows a respective unit to be independently introduced to framework 120 such a way that the unit can interoperate with other units (e.g., modules and services) of switch 102. Framework 120 supports MDA, OOP, and/or MVC design pattern to facilitate structured development and operation of the units in switch 102.

For example, instead of modifying protocol daemons 140, switch 102 can have plug-ins 134 for protocol daemons 140. Core management module 130 facilitates inter-operations between plug-in 134 and protocol daemons 140. Suppose that a modification to standard Ethernet protocol is needed. Instead of modifying the native protocol daemon of Ethernet, a plug-in for the protocol daemon of Ethernet can be introduced to core management module 130. Similarly, to facilitate membership to a fabric switch, fabric switch module 136 can be introduced to core management module 130. Fabric switch module 136 allows switch 102 to run a control plane with automatic configuration capability and join a fabric switch based on the control plane. Plug-ins 134 and fabric switch module 136 can be developed using MDA, OOP, and/or MVC design patterns, supported by framework 120.

Since the units of switch 102 operate core management module 130 in a structured way, their associated attribute values can be stored in a persistent storage in a structured way. In some embodiments, core management module 130 uses Object-Relational Mapping to store the attribute values of the units in a structured way in an object relational database 150. Core management module 130 allows different classes to be defined for a unit during development based on MDA, OOP, and/or MVC design patterns and expressed as a UML model, and seamlessly maps a respective class to a database table in database 150 and vice-versa.

Furthermore, core management module 130 also seamlessly represents the relations among the classes (e.g., an association or a composition) in database 150. As a result, when a unit becomes operational on switch 102 (e.g., when switch 102 powers up), attribute values associated with a respective class in that unit is automatically loaded from database 150. Moreover, if a class changes (e.g., a new attribute or a new relationship), core management module 130 seamlessly incorporates that change into database 150. It should be noted that a class defined by a user may not include explicit instructions (e.g., a Structured Query Language (SQL) query) for inserting and retrieving attribute values from database 150. The class simply includes an instruction indicating that persistent storage is required for some operations and core management module 130 facilitates the object relational mapping, and the corresponding database operations (e.g., SQL insert and select).

Attribute Data Types

To facilitate seamless object relational mapping, a persistent storage framework defines a set of data types for different categories of attributes. These attributes can be used to define class attributes of different operational units of a switch. In some embodiments, the framework can identify these class attributes expressed in a UML model. It should be noted that such expression can be represented in various forms, such as graphical, textual, XML, etc. The framework ensures these attributes are compatible with an object relational database. As a result, during operation, the framework can seamlessly map the class attributes to an object relational database and provide persistent storage to the attributes.

A data type of an attribute is basic entity provided by the framework that can be persisted or transported in the object relational database. A data type is associated with an identifier (e.g., a name). A data type can be, persisted or ephemeral, configuration or operational and read-only or read-write. The framework can serialize or de-serialize a data type to or from: XML, remote procedure call (RPC), SQL, JavaScript Object Notation (JSON), and Open vSwitch Database (OVSDB) management protocol.

The framework supports different categories of attributes. Such categories include, but are not limited to, integers and numbers, string, date and time, messaging, UML relations, network, and others. In addition, the framework supports user defined data types and corresponding attributes. Table 1 includes different categories of attributes and their corresponding data types supported by the framework. It should be noted that the categories and data types listed in Table 1 is not exhaustive. The framework can support more categories and data types.

TABLE 1

Data types supported by Persistent Storage Framework

| Category | Data Types |
| --- | --- |
| Integers and Numbers | 8-bit Unsigned Integer (UI8), 8-bit Signed Integer (SI8), UI16, SI16, UI32, SI32, UI64, SI64, 64-bit decimal (Decimal64)<br>Vector variants of all of the above<br>User-configured variants of all of the above<br>UI32Range |
| String | String, StringVector, StringVectorVector, StringUC |
| Date and Time | Date, Time, DateTime<br>Vector variants of all of the above and<br>User-configured variants of all of the above |
| Messaging | ServiceId, ResourceId, ResourceEnum<br>MessageType, MessagePriority, LocationId, SerializableObjectType |
| UML Relations | Association, Aggregation, Composition |
| Network | Universally Unique Identifier (UUID), World Wide Name (WWN), IPv4Address, IPv4AddressNetworkMask, IPv6Address, IPv6AddressNetworkMask, IPvXAddress, IPvXAddressNetworkMask, Uniform Resource Identifier (URI), MACAddress, MACAddress2, Host, SNMPObjectId (Simple Network Management Protocol (SNMP))<br>Vector variants of all of the above and<br>User-configured variants of all of the above |
| SQL | SQLIn, SQLBetween, SQLComparator, SQLExists |
| Other | Union, Bool, BoolUC, BoolVector, SerializableObject, SerializableObjectVector ManagedObject, ManagedObjectVector, Enumeration ObjectId, ObjectIdVector<br>LargeObject, Map, XML |

The framework provides extensive list of built-in data types, as described in conjunction with Table 1. These data types capture the attribute values (e.g., data fields) of objects. In some embodiments, the framework includes one or more attributes that provide run time introspection that allows runtime identification of classes. Since attributes can be serialized to and de-serialized from a variety of formats, the framework provides extensive support for custom behavior overriding in serialization and de-serialization. Furthermore, the framework supports user defined data types.

Object Identifier

In the example in FIG. 1B, framework 120 stores attribute values of different classes in database 150. During operation, a class is instantiated in switch 102 (e.g., in the memory of switch 102), and one or more attributes of that instance are assigned corresponding values. For example, if the class represents a line card switch 102, an attribute can be a MAC address of a port in that line card (e.g., MACAddress data type). When the line card becomes active, an instance of the class, which can be referred to as an object, is created in the memory of switch 102, and framework 120 stores the attribute values of that object in a table associated with the class in database 150.

However, a switch can have a plurality of line cards. For another line card, another object (i.e., another instance) of the class is created in the memory of switch 102, and framework 120 stores the attribute values of that other object in the table associated with the class in database 150. In this way, the same table can store attribute values of different objects of the same class. To identify different objects of a class in the table, framework 120 generates and assigns an object identifier (object ID or OID) to a respective object of a respective class. This object identifier operates as the primary identifier of that object. In the database table, this primary identifier is the primary key of that table. It should be noted that an object identifier is referred to be associated with a class in a generic sense, which indicates an object identifier of an object of the class.

Figure 2:
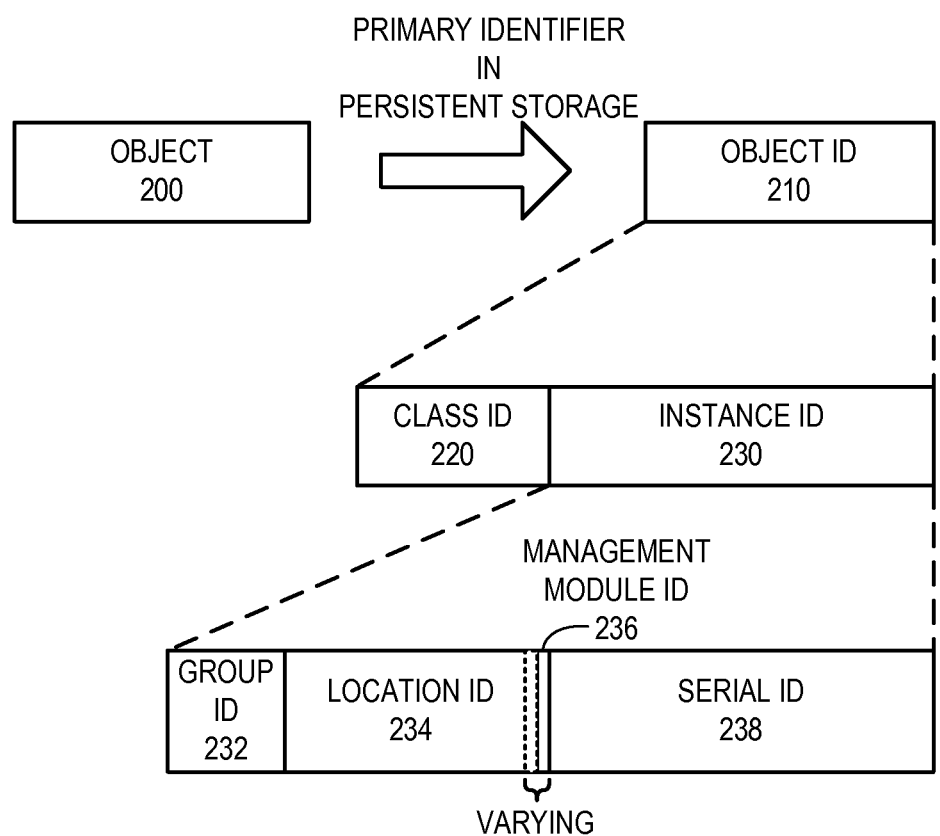
FIG. 2 illustrates an exemplary object identifier generated by a persistent storage framework in a switch, in accordance with an embodiment of the present invention.

FIG. 2 illustrates an exemplary object identifier generated by a persistent storage framework in a switch, in accordance with an embodiment of the present invention. During operation, an object 200 of a class is created in the memory of a switch. The persistent storage framework of the switch creates an object identifier 210 for object 200. This object identifier 210 can be the primary identifier for object 210 in the persistent storage. If the persistent storage is an object relational database, the database can include a table corresponding to the class. The attribute values of object 200 and object identifier 210 are inserted into the table. Object identifier 210 can be the primary key for that table.

In some embodiments, object identifier includes a class identifier (a class ID or CID) 220 and an instance identifier (an instance ID or IID) 230. Class identifier 220 represents the class from which the object is instantiated. In some embodiments, class identifier 220 is generated based on a hash function (e.g., Rabin Polynomial hash function) applied to the name of the class. Instance identifier 230 represents that particular instance of the object. Hence, if two objects of the same class are created, class identifier 220 of object identifier 210 remains the same for both the objects. However, the two objects differ in their respective instance identifier 230. Typically, class identifier 220 and instance identifier 230 are 32 and 64 bits long, respectively. However, these lengths can vary.

In some embodiments, instance identifier 230 includes a group identifier 232, a location identifier 234, a management module identifier 236, and a serial identifier 238. Group identifier 232 identifies a group in which the switch is a member. For example, if the switch is a member switch of a fabric switch, group identifier 232 can be a fabric switch identifier, which identifies a fabric switch. Location identifier 234 identifies the switch in the group. For example, if the switch is a member switch of a fabric switch, location identifier 234 can be a switch identifier, which identifies the switch within that fabric switch. Typically, group identifier 232 and location identifier 234 are 10 and 20 bits long, respectively.

Management module identifier 236 identifies the type of management module is operating the switch. For example, if the switch is participating in an active-standby high availability protocol (e.g., Virtual Router Redundancy Protocol (VRRP) and Virtual Switch Redundancy Protocol (VSRP)), management module identifier 236 can indicate whether the switch is an active or a standby switch. Typically, management module identifier 236 is 1 bit long. However, length of management module identifier 236 can be increased by incorporating adjacent bits from location identifier 234.

Serial identifier 238 provides identification of a specific instance of an object and can be a wrapped-around monotonically increasing number (e.g., an unsigned integer). Typically, serial identifier 238 is 32 bits long. In this way, object identifier 210 uniquely identifies an object of a class created by a management module in a switch, which can be in a fabric switch. In other words, object identifier 210 can be unique among objects, classes, management modules, fabric switches, and switch locations within a corresponding fabric switch.

Base Classes

In the example in FIG. 1B, persistent storage framework 120 maps classes to object relational tables in database 150, and inserts attribute values of an object of the class into the table. Framework 120 provides a set of base classes from which a class created for an operational unit of switch 102 can be inherited from. These base classes provide a development framework for the operational units and ensure that the operational units of switch 102 remain structured during operation. In this way, framework 120 can facilitate structured persistent storage to the attribute values of the operational units.

Figure 3:
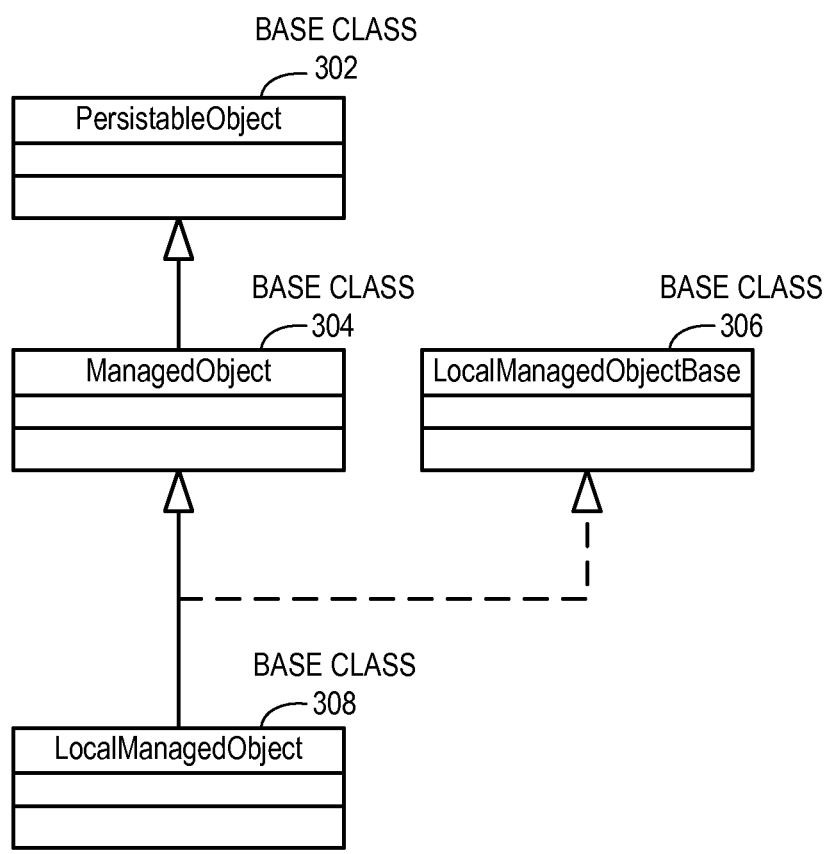
FIG. 3 illustrates exemplary base classes for supporting a persistent storage framework in a switch, in accordance with an embodiment of the present invention.

The framework supports a set of base classes and multiple inheritance from these base classes. FIG. 3 illustrates exemplary base classes for supporting a persistent storage framework in a switch, in accordance with an embodiment of the present invention. In some embodiments, the most base class 302 is the PersistableObject class. This class outlines the most fundamental operations supported by the persistent storage framework of a switch. Another base class 304, denoted as the ManagedObject class, is virtually derived from the PersistableObject class. Any object instantiated from an inheritance chain of the ManagedObject class can be referred to as a managed object. The framework provides seamless persistent storage support to these managed objects.

Class 304 outlines the most common attributes and operations of the objects managed by the framework. In other words, all class hierarchies derive virtually from the PersistableObject class. Since a class can inherit from multiple classes and each of these classes can inherit from the PersistableObject class, there can potentially be a conflict during execution of a managed object. This problem is generally referred to as the diamond problem. To solve this problem, the framework supports virtual derivation from the PersistableObject class. Another base class 306, denoted as the LocalManagedObjectBase class, outlines the attributes and operations locally managed within a switch. For example, a port is locally managed in a switch.

Base class 308, denoted as the LocalManagedObject class, is virtually derived from the ManagedObject class and the ManagedObjectBase class. Hence, the LocalManagedObject class outlines the attributes and operations of a switch which are locally and globally managed. For example, a port is locally managed within a switch and a VLAN configured for the port is managed globally. In some embodiments, an application (e.g., a protocol plug-in) running on a switch can specify more base classes for that application. Typically, base classes are not directly mapped to the tables of the object relational database. These base classes provide object relational mapping support. The attributes (i.e., the data fields) of these classes become part of a respective managed object derived from these base classes. As a result, the managed objects can share states and behavior.

In some embodiments, the attributes of a managed object can be any of the attribute data types supported by the framework, as described in conjunction with Table 1. The framework also supports vector variants (e.g., arrays and lists) for a number of the data types. Furthermore, the framework provides support to check whether a particular attribute is user configured. As described in conjunction with FIG. 3, the framework supports hierarchical managed objects based on inheritance. The framework also supports weak and strong references to objects. A weak reference does not protect the referenced object from being destroyed (e.g., by a garbage collector), unlike a strong reference, which protects the object from being destroyed.

Object Relational Mapping

In some embodiments, a persistent storage framework of a switch supports, both one-to-one and one-to-many, association, aggregation, and composition UML relationships. Association and aggregation are supported via ObjectID and ObjectIDVector data types, and ObjectIDAssociation and ObjectIDAssociationVector attributes, respectively. On the other hand, composition is supported via ManagedObectPointer and ManagedObectPointerVector data types and corresponding attributes. In some embodiments, the framework supports smart pointers and vector to facilitate seamless development.

Figure 4A:
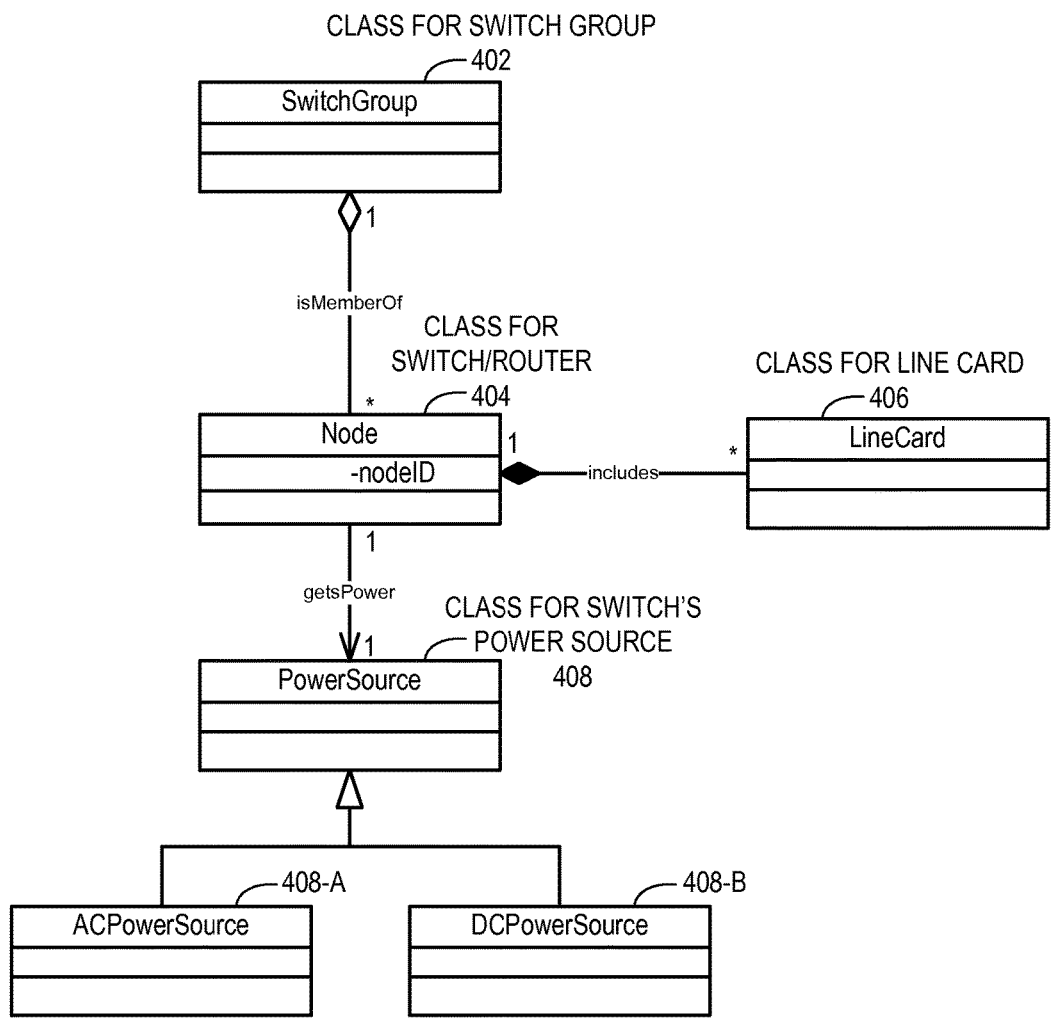
FIG. 4A illustrates an exemplary Unified Modeling Language (UML) model of classes of a switch with a persistent storage framework, in accordance with an embodiment of the present invention.

FIG. 4A illustrates an exemplary UML model of classes of a switch with a persistent storage framework, in accordance with an embodiment of the present invention. In this example, a class 404, denoted as the Node class, represents network nodes, such as a switch or a router. Attributes for the Node class includes a NodeID, which represents an identifier for a node. Since a switch can be a member of a switch group (e.g., a fabric switch), the Node class has a relationship with class 402, denoted as the SwitchGroup class, which represents a group of switches. A switch can be in one such switch group and a switch group aggregates a plurality of switches. Hence, the relationship between the Node class and the SwitchGroup class is a one-to-many aggregation, which is denoted as "isMemberOf." In this relationship, the SwitchGroup class can be referred to as the container class since a switch group "contains" a switch. On the other hand, the Node class can be referred to as a related class.

Similarly, a switch can include one or more line cards. Hence, the Node class has a relationship with class 406, denoted as the LineCard class, which represents a line card. A line card can be in one switch and a switch includes (i.e., is composed of) a plurality of line cards. Hence, the relationship between the Node class and the LineCard class is a one-to-many composition, which is denoted as "includes." On the other hand, a switch typically has a power source, which may not be inside of the switch. So, the Node class has a relationship with class 408, denoted as the PowerSource class, which represents a power source of a node. Suppose that, at a time, a power source can power one switch and a switch can receive power from one source. Hence, the relationship between the Node class and the PowerSource class is a one-to-one association, which is denoted as "getsPower."

A power source can be based on alternating current (AC) or direct current (DC). So, class 408-A, denoted as the ACPowerSource class, and class 408-B, denoted as the DCPowerSource class, are derived from the PowerSource class. The ACPowerSource class and the DCPowerSource class represent AC and DC power sources, respectively. Hence, based on the getsPower association, a Node can get power from a generic power source, an AC power source, or a DC power source. In this UML diagram, since the relationship between the Node class and class 408 is one-to-one, an object of the Node class can have only one of the power sources. In this example, the PowerSource class, the ACPowerSource class, and the DCPowerSource class can be referred to as the inheritance chain of the PowerSource class (class 408).

The framework can receive the UML diagram of FIG. 4A and generate the corresponding classes in a supported programming language (e.g., C++, Java, C#, etc). Furthermore, the framework generates an object relational table for the classes in the model. Furthermore, the framework can generate corresponding auxiliary tables to represent one-to-many relationships, as well as tables for classes in an inheritance chain (e.g., class derivations) and for their corresponding instances (i.e., objects), as described in conjunction with FIGS. 4C and 4D. In some embodiments, the framework receives XML representation of classes and their relationship (e.g., from a user), and generates the corresponding classes and tables. FIG. 4B illustrates an exemplary XML representation of a class corresponding to a switch with a persistent storage framework, in accordance with an embodiment of the present invention. In this example, XML definition 400 represents the Node class (class 404 of the UML model in FIG. 4A). XML definition 400 represents class Node as a ManagedObject with name "Node."

XML definition 400 includes a respective attribute, such as NodeID, and its type (i.e., data type, as described in conjunction with Table 1). XML definition 400 also includes one-to-one and one-to-many relationships for which the Node class is a container class. For example, a node contains line cards. Hence, XML definition 400 specifies aggregation "includes" as an attribute, its type, and the class to which Node is related. It should be noted that the isMemberOf relationship is not represented in XML definition 400 even though the isMemberOf relationship to the Node class. This is because the container class for the isMemberOf relationship is the SwitchGroup class. Hence, the isMemberOf relationship is represented in an XML definition corresponding to the SwitchGroup class (not shown in FIG. 4B).

Persistent Storage in a Switch

Figure 4C:
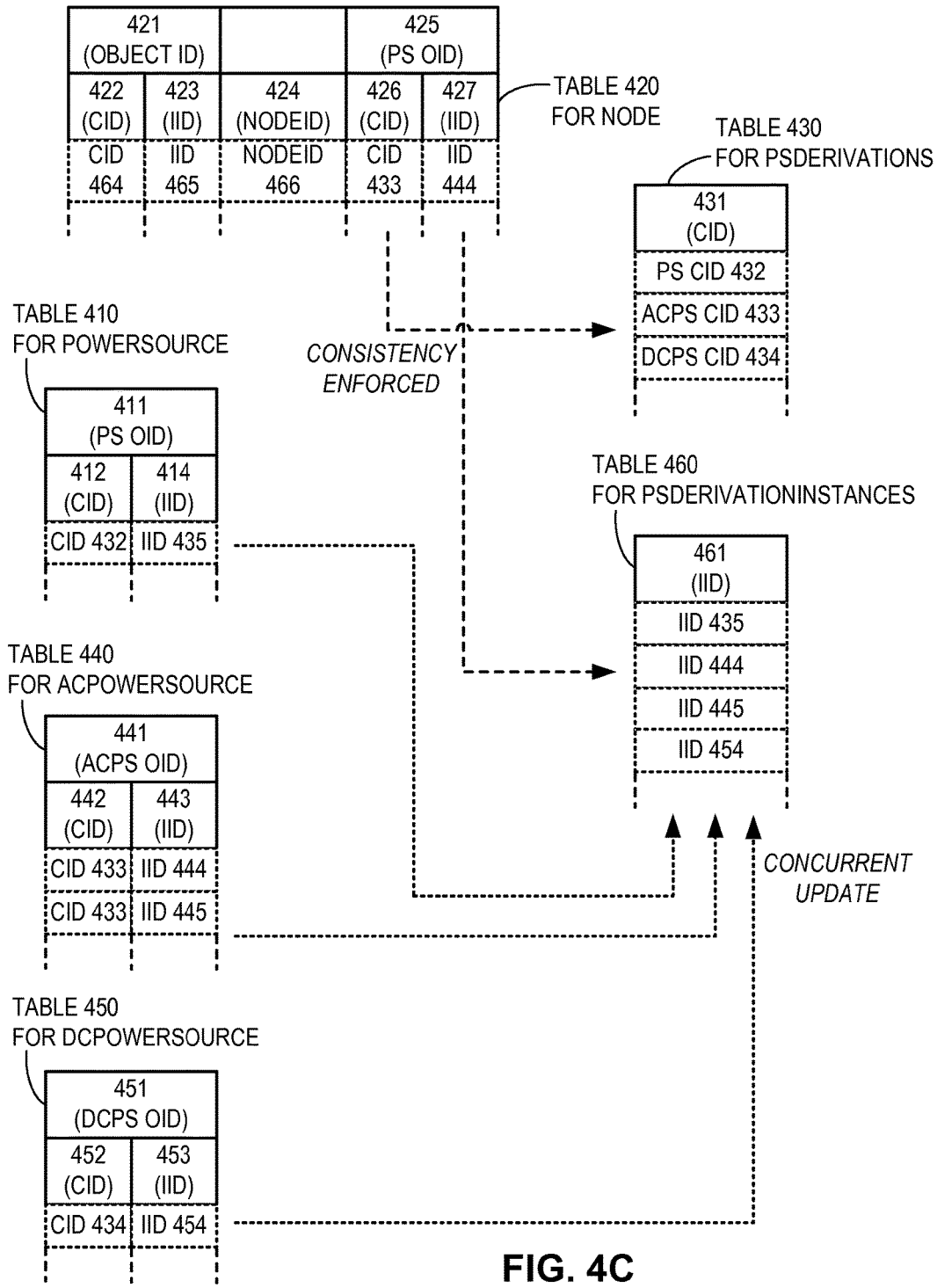
FIG. 4C illustrates exemplary tables generated by a persistent storage framework in a switch, in accordance with an embodiment of the present invention.

Upon receiving XML definitions associated with the classes of a UML model, the framework creates a respective table for a respective class, their derivations, their instances (i.e., objects), and their one-to-many relationships in an object relational database. FIG. 4C illustrates exemplary tables generated by a persistent storage framework in a switch, in accordance with an embodiment of the present invention. During operation, the persistent storage framework of the switch generates a table 420 for the Node class in an object relational database. Table 420 includes a column 421 for an object identifier associated with the Node class. Column 421 includes two columns 422 and 423 for class identifier and instance identifier, respectively, of the object identifier associated with the Node class.

Table 420 also includes a column for a respective attribute of the Node class. For example, table 420 includes a column 424 for a NodeID of the Node class. Furthermore, since the Node class has a one-to-one association with the PowerSource class, for which the Node class is the container class, the framework includes a column 425 for an object identifier of an object of the PowerSource class (i.e., an object associated with the PowerSource class). Column 425 includes two columns 426 and 427 for the class identifier and instance identifier, respectively, of the object identifier associated with the PowerSource class. The framework also creates a table 410 for the PowerSource class, comprising column 411 for the object identifier associated with the PowerSource class. Column 411 includes two columns 412 and 413 for the class identifier and instance identifier, respectively, of the object identifier of the PowerSource class.

Similarly, the framework also creates a table 440 for the ACPowerSource class, comprising column 441 for an object identifier of an object of the ACPowerSource class (i.e., an object associated with the ACPowerSource class). Column 441 includes two columns 442 and 443 for the class identifier and instance identifier, respectively, of the object identifier associated with the ACPowerSource class. In the same way, the framework also creates a table 450 for the DCPowerSource class, comprising column 451 for an object identifier of an object of the PowerSource class. Column 451 includes two columns 452 and 453 for the class identifier and instance identifier, respectively, of the object identifier associated with the DCPowerSource class.

In some embodiments, the framework creates auxiliary tables to enforce consistency on columns 426 and 427. For example, the framework creates an auxiliary table 430 for the derivations of the PowerSource class (e.g., based on the UML model in FIG. 4A). In this example, table 430 corresponds to the PowerSource, ACPowerSource, and DCPowerSource classes. Table 430 includes a column 431 for the class identifier associated with the derivations of the PowerSource class. Similarly, the framework creates an auxiliary table 460 for the objects instantiated from the derivations of the PowerSource class. In this example, table 460 corresponds to the PowerSource, ACPowerSource, and DCPowerSource classes. Table 460 includes a column 461 for the instance identifiers of the objects instantiated from the derivations of the PowerSource class.

When a class identifier is generated for any class of the inheritance chain of the PowerSource class, that class identifier is inserted into table 430. The framework identifies the PowerSource, the ACPowerSource, and the DCPowerSource classes of the inheritance chain of the PowerSource class from the UML model in FIG. 4A and generates class identifiers 432, 433, and 434, respectively. The framework then inserts class identifiers 432, 433, and 434 into table 430. In this example, an entry in a table is denoted with dotted lines. Column 431 of table 430 provides consistency enforcement to column 426 of table 420 (denoted with a dashed arrow). In some embodiments, consistency enforcement of column 426 is based on a foreign key constraint on column 431 of table 430. On the other hand, when the framework identifies an object of the PowerSource, ACPowerSource, or the DCPowerSource class, the framework generates a corresponding object identifier and inserts the object identifier into table 410, 440, or 450, respectively.

When an object identifier is inserted into table 410, 440, or 450, the instance identifier of the object identifier is concurrently inserted into table 460 (denoted with dotted arrow). Suppose that, upon detecting an object in the memory of the switch, the framework inserts an object identifier comprising a class identifier 432 and instance identifier 435 into table 410. Similarly, an object identifier comprising a class identifier 433 and instance identifier 444, and an object identifier comprising a class identifier 433 and instance identifier 445 are inserted into table 440. An object identifier comprising a class identifier 434 and instance identifier 454 is inserted into table 450. The framework ensures that instance identifiers 435, 444, 445, and 454 are also inserted into table 460. Column 461 of table 460 provides consistency enforcement to column 426 of table 420 (denoted with a dashed arrow). In some embodiments, consistency enforcement to column 427 is based on a foreign key constraint on column 461 of table 460.

During operation, an object of the Node class is instantiated in the memory of the switch. The framework identifies the object in the memory and generates an object identifier for the object comprising a class identifier 464 and an instance identifier 465. The framework identifies the attribute values of the object, which includes NodeID 466 and an object identifier of a power source object. Suppose that the power source for the switch is an AC power source, and the object identifier comprises a class identifier 433 and an instance identifier 444, as stored in table 440 corresponding to the ACPowerSource class. The framework creates an entry in table 420 by inserting class identifier 464, instance identifier 465, NodeID 466, class identifier 433, and instance identifier 444 into table 420. Since consistency is enforced on columns 426 and 427, the relational database ensures that class identifier 433 and instance identifier 444 appear in columns 431 and 461, respectively.

Figure 4D:
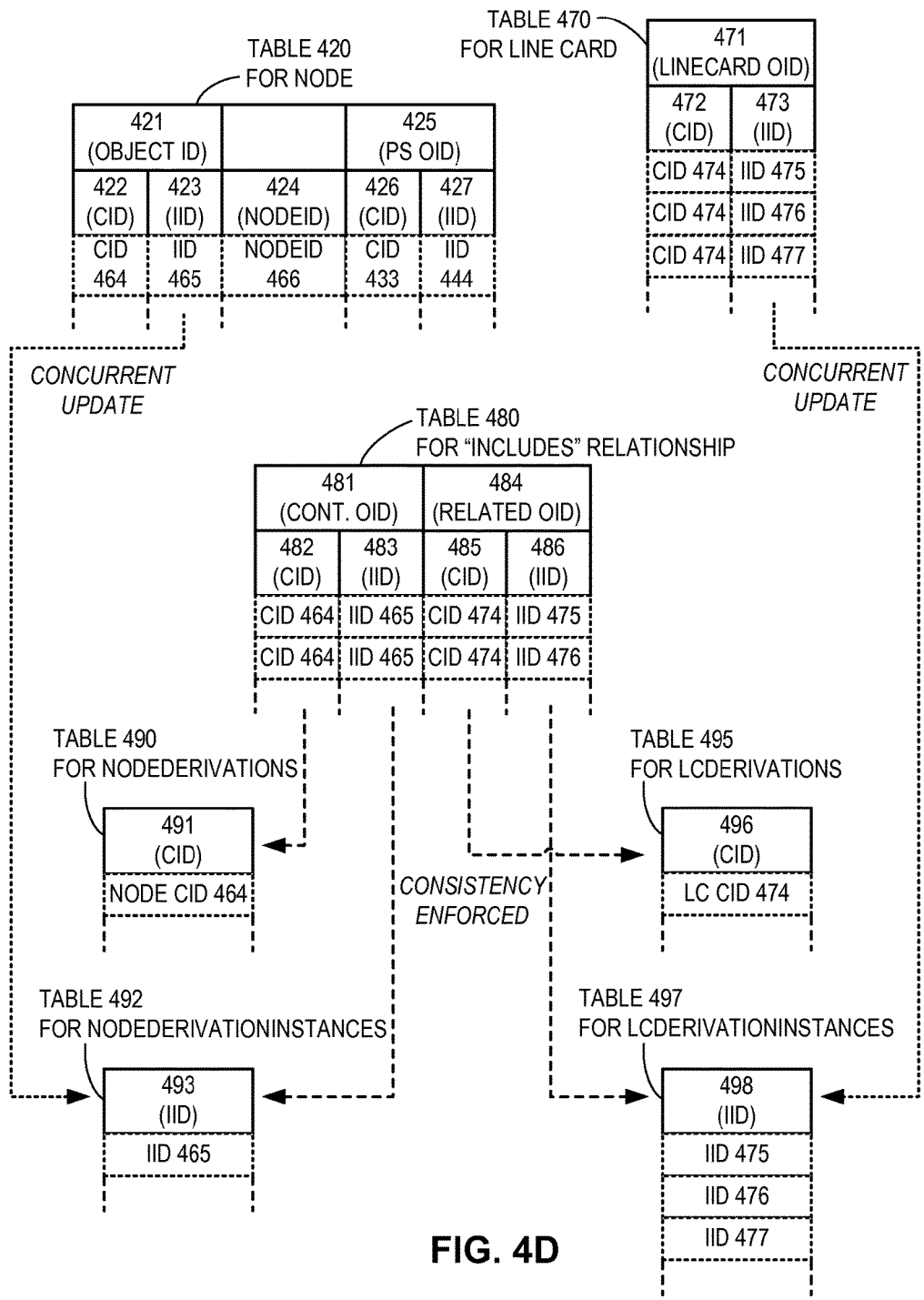
FIG. 4D illustrates an exemplary table representing a one-to-many association, which is generated by in a persistent storage framework in a switch, in accordance with an embodiment of the present invention.

However, even though the Node class is related to the LineCard class, since it is a one-to-many relationship, table 420 does not include an object identifier associated with the LineCard class. The framework creates an auxiliary table to represent the relationship the Node class and the LineCard class. FIG. 4D illustrates an exemplary table representing a one-to-many association, which is generated by a persistent storage framework in a switch, in accordance with an embodiment of the present invention. Upon detecting the LineCard class in the UML model in FIG. 4A, the persistent storage framework of the switch generates a table 470 for the LineCard class in an object relational database. Table 470 includes a column 471 for an object identifier associated with the LineCard class. Column 471 includes two columns 472 and 473 for corresponding class identifier and instance identifier, respectively, of the object identifier associated with the LineCard class.

During operation, an object of the LineCard class is instantiated in the memory of the switch. The framework identifies the object in memory and generates an object identifier comprising a class identifier 474 and an instance identifier 475 for the object. The framework then creates an entry in table 470 by inserting the object identifier into table 470. Similarly, the framework generates an object identifier comprising a class identifier 474 and an instance identifier 476 for another object of the LineCard class, and a third object identifier comprising a class identifier 474 and an instance identifier 477 for an object of the LineCard class. The framework creates respective entries in table 470 by inserting these object identifiers into table 470.

In some embodiments, the framework creates an auxiliary table 480 to represent the one-to-many "includes" relationship between the Node class and the LineCard class. In the relationship, the Node class is the container class and the LineCard class is the related class. Table 480 includes a column 481 for an object identifier associated with the Node class, and a column 484 for an object identifier associated with the LineCard class. Column 481 includes two columns 482 and 483 for the class identifier and instance identifier, respectively, of the object identifier associated with the Node class. Similarly, column 484 includes two columns 485 and 486 for the class identifier and instance identifier, respectively, of the object identifier associated with the LineCard class.

Suppose that the object of the Node class, which is associated with class identifier 464 and instance identifier 465, includes two line cards. Hence, the object of the Node class include two objects (e.g., an ManagedObjectVector) of the LineCard class. Suppose that instance identifiers 475 and 476 belong to these two objects. As a result, the framework inserts class identifier 464, instance identifier 465, class identifier 474, and instance identifier 475 into table 480. The framework also inserts class identifier 464, instance identifier 465, class identifier 474, and instance identifier 476 into table 480. In this way, the relationship between the object of the Node class (associated with instance identifier 465) and two objects of the LineCard class (associated with instance identifier 475 and 476) is stored in table 480.

In some embodiments, similar to tables 430 and 460, the framework creates auxiliary table 490 for the derivations of the Node class (e.g., based on the UML model in FIG. 4A). In this example, table 490 corresponds to the Node class (and its derivations, if any). Table 490 includes a column 491 for the class identifier associated with the derivations of the Node class. Similarly, the framework creates an auxiliary table 492 for the objects instantiated from the derivations of the Node class. In this example, table 492 corresponds to the Node class (and its derivations, if any). Table 492 includes a column 493 for the instance identifiers of the objects instantiated from the derivations of the Node class.

In the same way, the framework creates auxiliary table 495 for the derivations of the LineCard class (and its derivations, if any). Table 495 includes a column 496 for the class identifier associated with the derivations of the LineCard class. Similarly, the framework creates an auxiliary table 497 for the objects instantiated from the derivations of the LineCard class. In this example, table 497 corresponds to the LineCard class (and its derivations, if any). Table 497 includes a column 498 for the instance identifiers of the objects instantiated from the derivations of the LineCard class.

When a class identifier is generated for the Node class or the LineCard class, that class identifier is inserted into table 490 or 495, respectively. The framework inserts class identifiers 464 and 474 associated with the Node and the LineCard classes, respectively, into tables 490 and 495, respectively. In this example, an entry in a table is denoted with dotted lines. Column 491 of table 490 provides consistency enforcement to column 482 of table 480 (denoted with a dashed arrow). In some embodiments, consistency enforcement of column 482 is based on a foreign key constraint on column 491 of table 490. In the same way, column 496 of table 495 provides consistency enforcement to column 485 of table 480 (denoted with a dashed arrow). In some embodiments, consistency enforcement of column 485 is based on a foreign key constraint on column 496 of table 495.

On the other hand, when the framework identifies objects of the Node or the LineCard class, the framework generates a corresponding object identifier and inserts the object identifier, comprising a class identifier and an instance identifier, into table 420 or 470, respectively. When an object identifier is inserted into table 420 or 470, the instance identifier of the object identifier is concurrently inserted into table 492 or 497, respectively (denoted with dotted arrow). For example, when the framework inserts an object identifier comprising a class identifier 464 and instance identifier 465 into table 420, instance identifier 465 is inserted into table 492. In the same way, when the framework inserts an object identifier comprising a class identifier 474 and instance identifier 475 into table 470, instance identifier 475 is inserted into table 497.

Similar to table 480, the framework also creates an auxiliary table to represent the one-to-many "isMemberOf" relationship between the Node class and the SwitchGroup class, as described in conjunction with FIG. 4A. That table includes a column for an object identifier associated with the container class, which is the SwitchGroup class, and a column for an object identifier associated with the related class, which is the Node class. The column for the object identifier associated with the SwitchGroup class includes two columns corresponding to class identifier and instance identifier, respectively, of the object identifier. Similarly, the column for the object identifier associated with the Node class includes two columns corresponding to class identifier and instance identifier, respectively, of the object identifier.

It should be noted that the framework distinguishes between a composition relationship (e.g., "includes" in FIG. 4A) and an aggregation relation (e.g., "isMemberOf" in FIG. 4A). In some embodiments, for a composition relationship, the class definition of the container class includes an attribute of data type ManagedObject (and/or ManagedObjectPointer), as described in conjunction with Table 1. In this disclosure, the phrases "class" and "class definition" are used interchangeably. If the relationship is one-to-many, the date type can be ManagedObjectVector (and/or ManagedObjectPointerVector). In this way, when an object of the container class is instantiated, the related objects are created and included in that instantiated object of the container class. On the other hand, for an aggregation relationship, the class definition of the container class includes an attribute of data type ObjectId. If the relationship is one-to-many, the date type can be ObjectIdVector. In this way, the objects are created separately, and when an object of the container class is instantiated, only references to those related objects are included in that instantiated object of the container class.

Operations of a Persistent Storage Framework

Figure 5A:
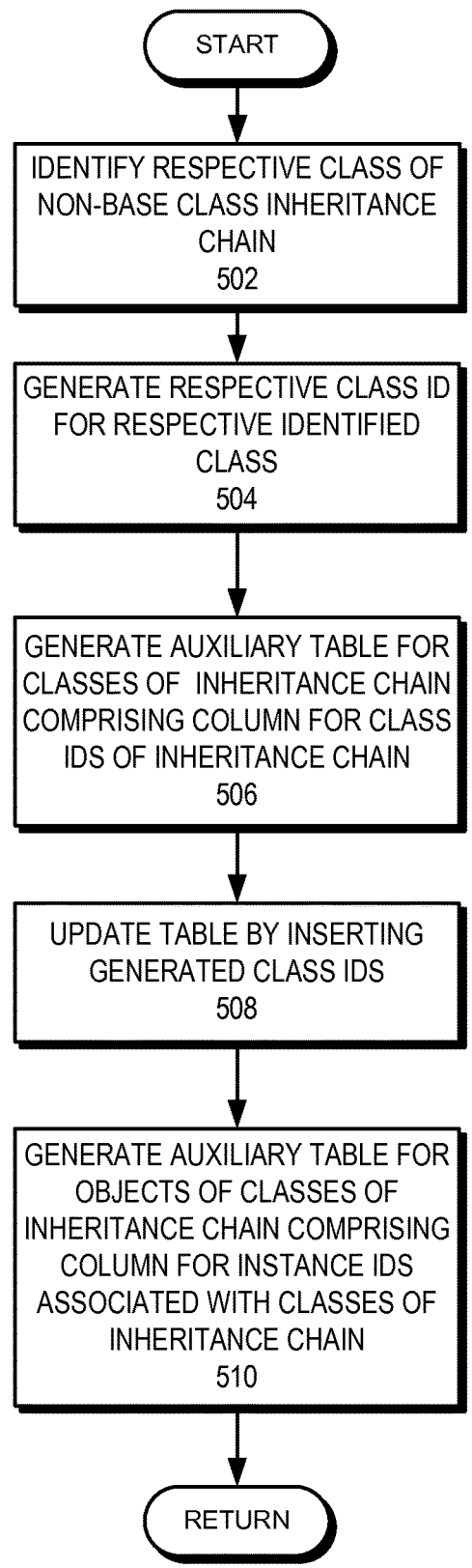
FIG. 5A presents a flowchart illustrating the process of a persistent storage framework of a switch generating auxiliary tables for an inheritance chain in a persistent storage, in accordance with an embodiment of the present invention.

FIG. 5A presents a flowchart illustrating the process of a persistent storage framework of a switch generating auxiliary tables for an inheritance chain in a structured persistent storage, in accordance with an embodiment of the present invention. During operation, the framework identifies a respective class of a non-base class inheritance chain (operation 502). The framework generates a respective class identifier for a respective identified class (operation 504). The framework generates an auxiliary table for the classes of the inheritance chain comprising a column for the class identifiers of the inheritance chain (operation 506) and updates the table for the classes of the inheritance chain by inserting the generated class identifiers (operation 508). The framework also generates an auxiliary table for the objects (i.e., the instantiated objects) of the classes of the inheritance chain, each comprising a column corresponding to the instance identifiers associated with the classes of the inheritance chain (operation 510).

Figure 5B:
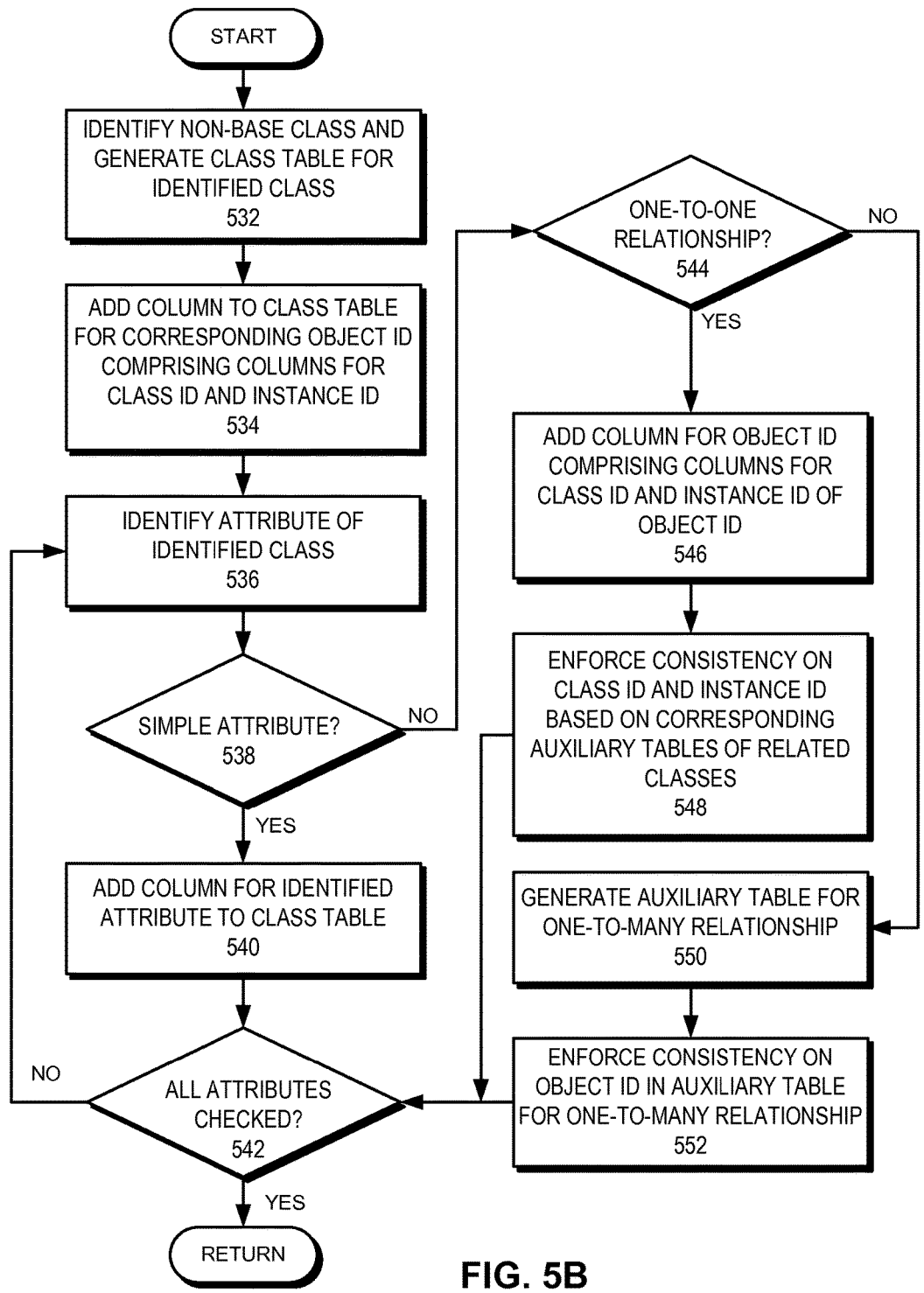
FIG. 5B presents a flowchart illustrating the process of a persistent storage framework of a switch generating class tables in a persistent storage, in accordance with an embodiment of the present invention.

FIG. 5B presents a flowchart illustrating the process of a persistent storage framework of a switch generating class tables in a structured persistent storage, in accordance with an embodiment of the present invention. During operation, the framework identifies a non-base class and generates a class table for the identified class (operation 532). In some embodiments, the framework identifies the class, and the attributes and operations (e.g., data members and methods) of the class from a class model (e.g., a UML model). The framework can receive the UML model from a graphical or textual input (e.g., a GUI, CLI, or XML file). In some embodiments, the table is named based on a hash function (e.g., a Rabin Polynomial hash function) calculated on the name of the class. The table can also have a prefix "T." For example, if the name of the class is Node and hash("Node") =xxx, the table name can be Txxx. The framework adds a column comprising columns for a class identifier and an instance identifier to the class table for an object identifier (operation 534), as described in conjunction with FIG. 4C.

The framework identifies an attribute of the identified class (operation 536). It should be noted that the relationships for which the class is a container class are can also be attributes, as described in conjunction with FIG. 4A. The framework then checks whether the attribute is a simple attribute (e.g., not a relationship) (operation 538). If the attribute is a simple attribute, the framework adds a column for the identified attribute to the class table (operation 540). If the attribute is not a simple attribute (e.g., an attribute representing a relationship), the framework checks whether the attribute corresponds to a one-to-one relationship (operation 544). If the attribute corresponds to a one-to-one relationship, the framework adds a column, which is for an object identifier, comprising columns for class identifier and instance identifier of the object identifier (operation 546), as described in conjunction with FIG. 4C.

The framework enforces consistency on the class identifier and the instance identifier based on the corresponding auxiliary tables of the related classes (operation 548), as described in conjunction with FIG. 4C. In some embodiments, the consistency is enforced based on a foreign key constraint. If the attribute does not correspond to a one-to-one relationship (i.e., corresponds to a one-to-many relationship), the framework generates an auxiliary table for the one-to-many relationship (operation 550) and enforce consistency on object identifiers in the auxiliary table for the one-to-many relationship (operation 552). Upon adding a column for the identified attribute (operation 540), enforcing consistency on the class identifier and the instance identifier (operation 548), or enforcing consistency on the object identifier (operation 552), the framework checks whether all attributes have been checked (operation 542). If not, the framework continues to identify an attribute of the identified class (operation 536).

Figure 5C:
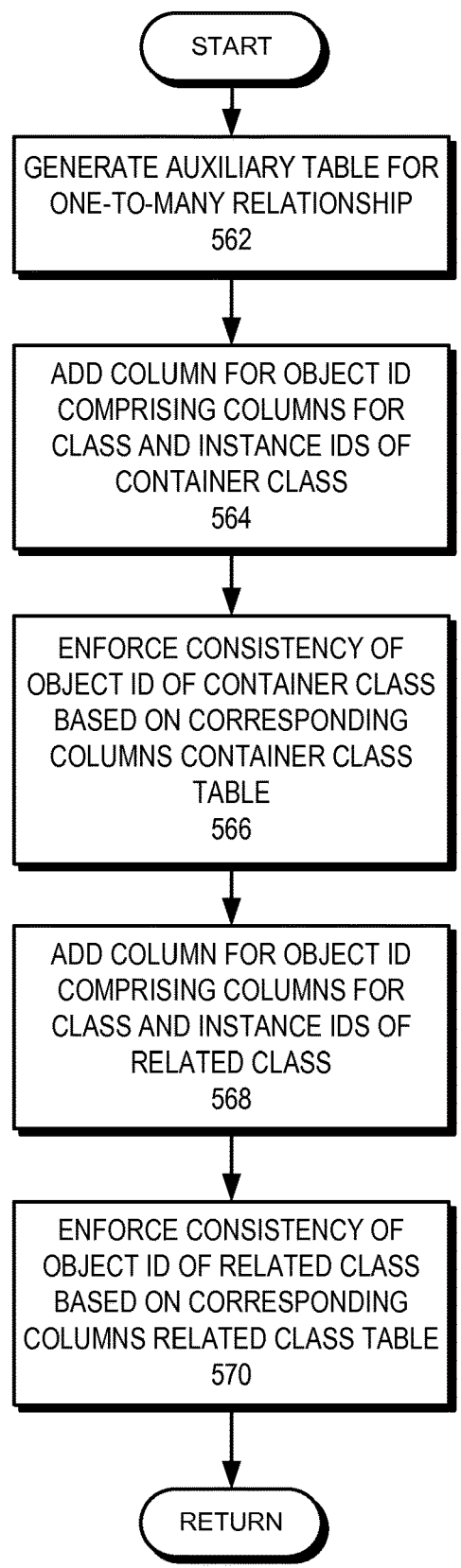
FIG. 5C presents a flowchart illustrating the process of a persistent storage framework of a switch generating an auxiliary table representing an one-to-many relationship in a persistent storage, in accordance with an embodiment of the present invention.

FIG. 5C presents a flowchart illustrating the process of a persistent storage framework of a switch generating an auxiliary table representing an one-to-many relationship in a structured persistent storage, in accordance with an embodiment of the present invention. Operations described in FIG. 5C elaborates operation 550 of FIG. 5B. During operation, the framework generates an auxiliary table for the one-to-many relationship (operation 562). In some embodiments, the name of the auxiliary table is based on the container table name, related table name, and the relationship name. For example, if the container table name is Txxx, related table name is Tyyy, and the relationship name is ABC, the name of the auxiliary table can be TxxxABCTyyy.

The framework adds a column for an object identifier comprising columns for class identifier and instance identifier of the container class (operation 564), as described in conjunction with FIG. 4D. The framework enforces consistency on the object identifier (i.e., both the class identifier and the instance identifier) of the container class based on the corresponding columns of the container class table (operation 566). Similarly, the framework adds a column for an object identifier comprising columns for class identifier and instance identifier of the related class (operation 568), as described in conjunction with FIG. 4D. The framework enforces consistency on the object identifier (i.e., both the class identifier and the instance identifier) of the related class based on the corresponding columns of the related class table (operation 570).

Figure 5D:
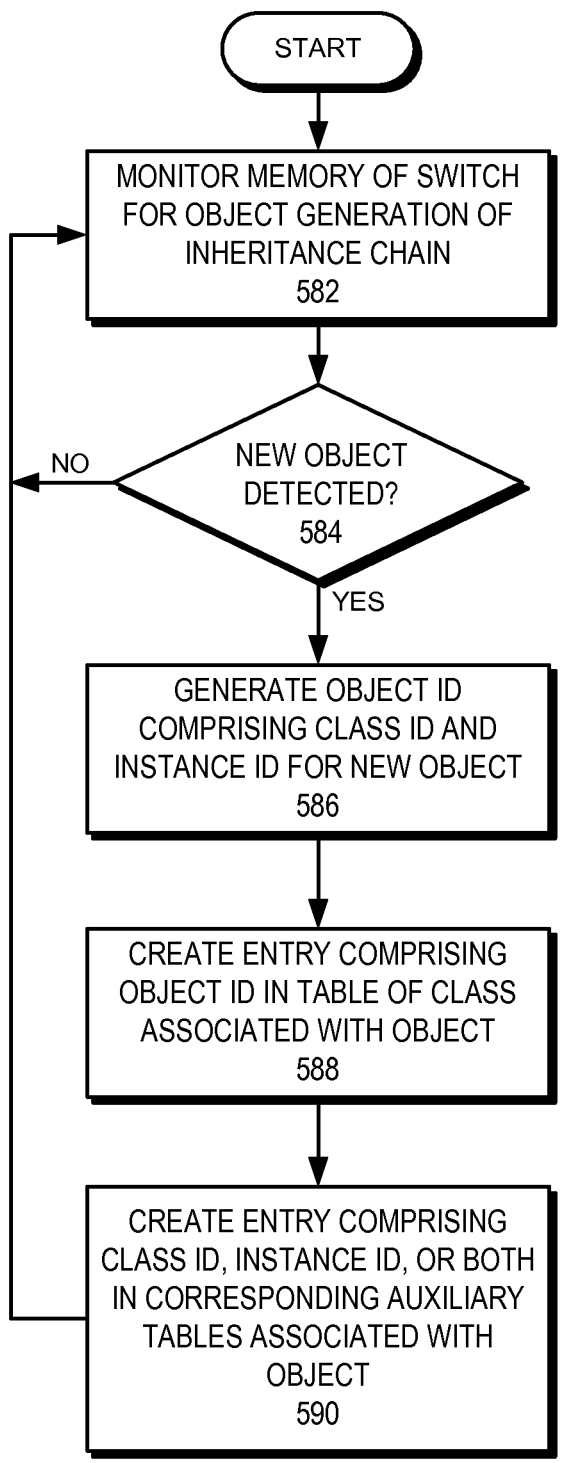
FIG. 5D presents a flowchart illustrating the process of a persistent storage framework of a switch updating tables in a persistent storage, in accordance with an embodiment of the present invention.

FIG. 5D presents a flowchart illustrating the process of a persistent storage framework of a switch updating tables in a persistent storage, in accordance with an embodiment of the present invention. During operation, the framework monitors the memory of the switch for object generation of the inheritance chain (operation 582) and checks whether a new object has been detected (operation 584). If a new object has not been detected, the framework continues to monitor the memory of the switch (operation 582). If a new object has been detected, the framework generates an object identifier comprising a class identifier and an instance identifier for the new object (operation 516). The frame creates an entry comprising the object identifier in the table of a class associated with the object (i.e., the class from which the object has been instantiated) (operation 588). The framework creates an entry comprising the class identifier, instance identifier, or both in corresponding auxiliary tables associated with the object (operation 590) and continues to monitor the memory of the switch (operation 582).

Distributed Configuration Management

In the example in FIG. 1A, network 100 can be a switch group (e.g., an Ethernet fabric switch). Under such a scenario, network 100 can also be referred to as switch group 100. In some embodiments, a switch group is a fabric switch. FIG. 6A illustrates an exemplary switch group with persistent storage framework and distributed configuration management support, in accordance with an embodiment of the present invention. In this example, switch 102, which is in switch group 100, can be configured by logging in to switch 102 using a management IP address (MIPA) 632 via a management port 602. Management port 602 can be an edge port, which is used for communicating configuration and control traffic. Switch 102 may not use management port 602 for data traffic. A user (e.g., an administrator) can use an end device 612 to log in to switch 102 based on management IP address 632 (e.g., using telnet via network 620). Switch 102 can also be configured via a console port (e.g., an RS-232 port) 604, which couples an end device 614 (e.g., a workstation). The user can access an input interface (e.g., a textual or graphical interface) of switch 102 from end device 612 or 614.

With existing technologies, a respective switch in switch group 100 is configured individually and the configuration process is repeated for a respective switch in switch group 100. Such configuration can be related to network virtualizations, partitions, and switch groups, and a plurality of network protocols of different network layers. The attribute values (e.g., parameters) of the configuration are applied to a respective switch, such as switch 102 (e.g., loaded to the switch modules, such as the processing hardware of switch 102). This process is repeated for switches 101, 103, 104, and 105. This process can be repetitive, tedious, and error-prone (e.g., human errors, such spelling mistake).

Furthermore, some of the configuration information is applicable for entire switch group 100 (e.g., a VLAN for switch group 100). Such configuration can be referred to as global configuration. This global configuration is repeated for a respective switch in switch group 100. This can lead to inconsistency among the global configuration in different switches in switch group 100. For example, the user repeats global configuration for switch 101, 102, 103, 104, and 105 in switch group 100. The user may, mistakenly, configure VLAN 110 in switch 102 and VLAN 111 in switch 101. As a result, traffic belonging to VLAN 110 may be erroneously dropped at switch 101.

To solve this problem, one of the switches in switch group 100 is elected as a principal switch, which manages and distributes configuration information in switch group 100. Suppose that switch 102 is elected as the principal switch. In some embodiments, a respective switch in switch group 100 broadcasts its information in switch group 100, and the switch with the lowest (or highest) identifier value is elected as the principal switch. Other switches of switch group 100, such as switches 101, 103, 104, and 105, can be referred to as managed switches. When the user accesses switch 102 (e.g., via end device 112 or 114), switch 102 allows the user to configure the global configuration of switch group 100. Switch 102, in turn, provides that global configuration to switches 101, 103, 104, and 105. Furthermore, switch 102 also allows the user to configure switches 101, 103, 104, and 105 in the switch group. Switch 102, in turn, provides the corresponding local configuration information to switches 101, 103, 104, and 105, respectively.

In some embodiments, a respective switch of switch group 100 is equipped with a persistent storage framework, as described in conjunction with FIG. 1B. The framework stores the configuration information, comprising both local and global configuration information, in a local persistent storage, which can be an object relational database. For example, in switch 102, framework 120 stores the configuration information in object relational database 150. The configuration information is loaded from database 150 to the switch modules (e.g., the ASIC chips of switch 102). Framework 120 maintains the global configuration of switch group 100 in database 150. Framework 120 also maintains respective local configuration of a respective switch, including switch 102, of switch group 100 in database 150. Switch 102 then provides a copy of database 150 to switches 101, 103, 104, and 105, each of which in turn, stores that copy in its object relational database. In this way, a respective switch in switch group 100 has the same local and global configuration. This allows a user to access the configuration of switch group 100 from any member switch.

Since switch 102 can also be accessed via console port 604 via end device 614, the user can configure switches of switch group 100 without the presence of a management network. It should be noted that, even though a user can configure the switches of switch group 100 from principal switch 102, the user can obtain the local configuration information of a respective switch of switch group 100 via any of the member switches of the switch group. For example, switch 101 can be accessed by logging in to switch 101 using a management IP address 631 via a management port 606. The user can use an end device 616 to log in to switch 101 based on management IP address 631. Since switch 101 includes the configuration information in object relational database 640 of switch 101, the user can obtain the global configuration information as well the local configuration information of a respective switch of switch group 100 from switch 101.

In some embodiments, switch group 100 is associated with a virtual IP address 610. During operation, virtual IP address 610 is associated with the principal switch of switch group 100. As a result, the user can access principal switch of group 100 via virtual IP address 610 without knowing the management IP address 632. Furthermore, if switch 102 becomes unavailable (e.g., due to a failure), another switch in switch group 100, such as switch 101, is elected as the principal switch and virtual IP address 610 becomes associated with switch 101. Since switch 101 has the configuration information in database 640 is the same as the configuration information in database 150, switch 101 can continue to facilitate distributed configuration for the switches of switch group 100. As a result, the user can continue to access the principal switch of switch group 100, which is switch 101, via virtual IP address 610 and configure the switches of switch group 100.

In some embodiments, a respective switch in switch group 100 is associated with an internal control IP address (ICIPA), which is used for communication among member switches of switch group 100. For example, an internal control IP address can be used for communication via an inter-switch port. When the principal switch of a switch group provides the configuration information to a managed switch, the principal switch communicates with that managed switch based on respective internal control IP addresses. Suppose that internal control IP addresses 621 and 622 are associated with switches 101 and 102, respectively. When switch 102 provides the configuration information to switch 101, switch 102 uses IP addresses 621 and 622 as the destination and source addresses for the packets comprising the configuration information.

In some embodiments, a respective switch in a switch group can receive configuration information from a user. FIG. 6B illustrates an exemplary switch group with multi-input and multi-principal switch support, in accordance with an embodiment of the present invention. In this example, switches 101, 102, 103, 104, and 105 are associated with management IP addresses 631, 632, 633, 634, and 635, respectively. A user can provide configuration information to a respective switch (e.g., via a console of the switch) in switch group 100 by logging in to that switch using the corresponding management IP address via a management port. For example, a user can log in to switch 103 using management IP address 633 and provides configuration information 664. Configuration information 664 can be global configuration information associated with switch group 100 or local configuration information associated with any of the member switches. Similarly, the user can log in to switch 101 using management IP address 633 and provides configuration information 662.

Suppose that configuration information 662 and 664 can cause a conflict in the switch. For example, configuration information 662 and 664 can be associated with conflicting quality of service settings for switch 105. If both switches 101 and 103 are allowed to operate as a principal switch, switches 101 and 103 can individually apply these conflicting configurations to switch 105. This can lead to race condition in switch group 100. To solve this problem, a switch group internally has one principal switch, and other switches forward their received configuration information to that principal switch. That principal switch receives the configuration information, serializes them, resolves any conflict, and applies them based on distributed commit. In this way, it would appear to the user that the switch group is being configured from any of the member switches, though internally, the switch group is configured from the principal switch.

For example, switches 101 and 103 forward configuration information 662 and 664, respectively, to principal switch 102 of switch group 100. Switch 102 receives configuration information 662 and 664, and serializes them (e.g., based on the order of arrival or an associated priority). In some embodiments, if switch 102 detects any conflict, switch 102 resolves the conflict based on its serialization. For example, configuration information 664 is serialized before configuration information 662, switch 102 resolves the conflict by applying the configuration of configuration information 664 to switch 105 based on distributed commit, and discarding configuration information 662. In this way, it would appear to the user that switch 105 is being configured switches 101 and/or 103, though internally, switch 102 configures switch 105.

In some embodiments, in switch group 100, different member switch can be the principal switch for different services. A service can be a modular component which manages a related set of configuration. In the example in FIG. 1B, a plug-in can correspond to a service. A principal switch manages all global and local configuration information of the service the switch is associated with. Suppose that switches 101 and 102 are principal switches for port management and network virtualization, respectively. As a result, in switch group 100, switch 101 processes all global and local configuration information associated with port management, and switch 102 processes all global and local configuration information associated with network virtualizations. In some embodiments, switches in switch group 100 elect a principal switch for a respective service. The election process can be based on load balancing such that different services are associated with different principal switches.

During operation, a user logs in to switch 102 using management IP address 632 and provides configuration information 666, which is associated with port management (e.g., creating a port channel). Even though switch 102 is a principal switch, switch 102 forwards configuration information 666 to switch 101 since switch 101 is the principal switch for port management. On the other hand, suppose that configuration information 662 is associated with network virtualization (e.g., creating a new VLAN). Even though switch 101 is a principal switch, switch 101 forwards configuration information 662 to switch 102 since switch 102 is the principal switch for network virtualization.

FIG. 7 illustrates an exemplary distributed configuration management, in accordance with an embodiment of the present invention. As described in conjunction with FIG. 6A, suppose that switch 102 has been elected the principal switch of switch group 100. Switch 102 manages configuration information of a respective managed switch in switch group 100. In the example in FIG. 7, switch 102 manages configuration information of a managed switch 101. Database 150 of switch 102 includes global configuration information 701 and local configuration information 702. Database 640 of switch 101 includes global configuration information 703 and local configuration information 704.

Suppose that switch 101 is joining switch group 100 as a member switch (e.g., during the formation of switch group 100). During operation, switch 102 pauses the configuration updates to database 150 (operation 711) and stores the new updates in buffer 710. This provides consistency during the joining process. Switch 101 sends a message comprising global configuration information 703 to switch 102 (operation 712). Communication between switches 101 and 102 can be based on internal control IP addresses 621 and 622. Switch 102 receives the request and compares the local and received global configurations (operation 713). If the configuration matches, switch 102 determines that switch 101 can join switch group 100. It should be noted that a user configuring switch 102 via a console (e.g., console 650) may not be aware of this pause and continue to provide configuration information, which in turn is stored in buffer 710.

Switch 102 instructs switch 101 to clear its persistent storage (i.e., database 640) (operation 714). Switch 101 creates a local backup 709 of local configuration information 704 and removes configuration information 703 and 704 from database 640 (denoted with a "cross" sign) (operation 715). Switch 102 then sends an image of database 150 to switch 101 (operation 716). Upon receiving the image, switch 101 updates database 640 with the received image (operation 717). At this point, databases 150 and 640 have the same information, which includes configuration information 701 and 702. Switch 101 acknowledges the update of database 640 (e.g., by sending an update confirmation message) to switch 102 (operation 718). From this point on, configuration information in database 150 should match the configuration information in database 640. Hence, switch 102 initiates a distributed commit (operation 719) (i.e., uses the distributed commit to update configuration information, as described in conjunction with FIGS. 11A-11B).

Switch 102 resumes updates to database 150 (operation 720) by incorporating the update(s) stored in buffer 710. Switch 102 performs distributed commit(s) on the update(s) in buffer 710 (operation 721). To incorporate local configuration information 704 in the switch group, switch 101 sends the backed-up local configuration information 704 to switch 102 (operation 722). Upon receiving local configuration information 704, switch 102 performs distributed commit on local configuration information 704 (operation 723). During this distributed commit process, switch 102 includes local configuration information 704 in its local database 150 as well as in database 640 of switch 101.

At this point, databases 150 and 640 have the same configuration information. In this way, a principal switch forms a switch group and ensures a respective member switch of the switch group has the same configuration information in its local persistent storage. In some embodiments, global configuration information 701 is only active in database 150 of principal switch 102, and in a standby mode in database 640 of managed switch 101. Under such a scenario, attribute values of global configuration information 701 is only extracted from database 150 and applied in switch group 100. Global configuration information 701 becomes active in database 640 if switch 102 becomes unavailable and switch 101 is elected the principal switch of switch group 100.

A new switch can join switch group 100 after it has converged. As described in conjunction with FIG. 7, the new switch backs up its local configuration information, clears its local persistent storage, and receives the database image of database 150 from principal switch 102. The new switch then updates its local persistent storage with the database image of database 150. When switch group 100 converges, the database image of database 150 comprises the global configuration of switch group 100 and the local configuration of a respective member switch. As a result, the configuration information of switch group 100 becomes readily available to the new switch. Similar to operations 720 and 721, principal switch 102 receives the local configurations information of the new switch and performs a distributed commit to the local configurations information, which then becomes stored in the persistent storage of a respective member switch. The new switch can self-configure using the received information.

A switch can rejoin switch group 100 after it has converged. For example, switch 101 can leave (e.g., gets disconnected) and rejoin switch group 100. If its configuration information has not changed, switch 101 simply receives the database image of database 150, which comprises the global configuration of switch group 100 and the local configuration of a respective member switch, from switch 102 and self-configures using the received information. However, if the global configuration information of rejoined switch 101 has changed, switch 102 may not allow switch 101 to rejoin, as described in operation 713. On the other hand, if the local configuration information of rejoined switch 101 has changed, switch 102 receives the changed local configuration information and performs a distributed commit on the changed local configuration information. In this way, the local configuration information of rejoined switch 101 is updated in the persistent storage of a respective member switch, including databases 150 and 640. Hence, the local configuration information of a rejoined switch has higher priority over existing local configuration information of that switch.

A switch can be removed from switch group 100 even after it has converged. Under such a scenario, principal switch 102 performs a distributed commit to remove the local configuration information of the removed switch. For example, if switch 102 leaves switch group 100, principal switch 102 performs a distributed commit to remove local configuration information 704 from the persistent storage of a respective member switch.

Identifier Assignment

Figure 8A:
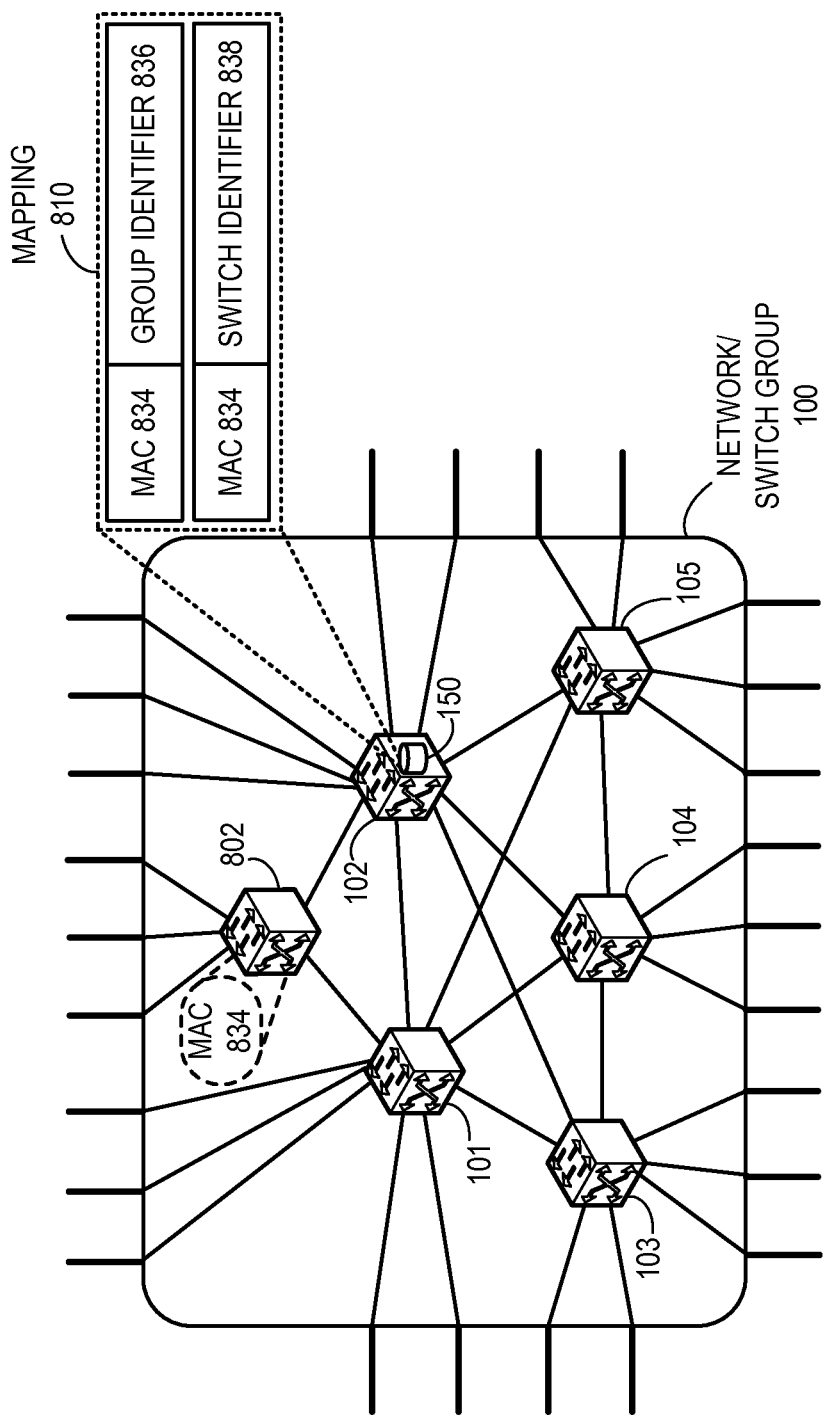
FIG. 8A illustrates an exemplary switch group with identifier assignment support for a new switch, in accordance with an embodiment of the present invention.

FIG. 8A illustrates an exemplary switch group with identifier assignment support for a new switch, in accordance with an embodiment of the present invention. During operation, a new switch 802 becomes available for joining switch group 100. This switch 802 is not yet a member of switch group 100. With existing technologies, a user (e.g., a network administrator of switch group 100) may decide to retain control over whether switch 802 joins switch group 100 or not. Furthermore, the user may decide which switch identifier to assign to switch 802 if it joins switch group 100. This switch identifier uniquely identifies switch 802 in switch group 100. In some embodiments, examples of a switch identifier include, but are not limited to, a TRILL RBridge identifier, an IP address, a MAC address, and a combination thereof. As a result, when a switch 802 becomes available, the user configures the switch identifiers to switch 802 and configures switch 802 as a new member switch of switch group 100. This process can be tedious and error-prone.

Since the user configures switch 802 to operate it as a member switch of switch group 100, switch 802 should be physically available for configuration. In other words, only when a vendor delivers switch 802 to a customer, the user may configure switch 802. Furthermore, the user may have to be physically present at the location of the deployment of switch 802. If the switches of switch group 100 become available incrementally, the user has to configure a switch individually when the switch becomes available. Suppose that switches 104 and 105 of switch group is delivered later than switches 101, 102, and 103. Even when the switch MAC addresses of switches 104 and 105 are known, the user can configure these switches only when switches 104 and 105 become physically available.

To solve this problem, principal switch 102 of switch group 100 pre-allocates the identifiers for new switch 802. Switch 802 can be a switch in a default mode (i.e., a bare-bone switch). In other words, switch 802 can be a switch which has not been configured yet (e.g., a new switch from a vendor). Typically, a MAC address 834 is assigned to switch 802. MAC address 834 is the switch MAC address of switch 802 and can be distinct from a MAC address of a port of switch 802. To facilitate automatic configuration of identifiers, switch 102 allocates a switch identifier 838 for switch 802. In some embodiments, switch 102 generates the switch identifier based on an identifier generation technique. Examples of an identifier generation technique include, but are not limited to, Switch 102 maintains a mapping 810 between switch MAC address 834 and switch identifier 838. In some embodiments, switch 102 stores mapping 810 in a table in database 150. Additionally, mapping 810 can also include a mapping between MAC address 834 and a switch group identifier 836 (e.g., a fabric identifier of a fabric switch) of switch group 100. Since switch group 100 has already been converged, switch group identifier 836 can be part of global configuration information 701, as described in conjunction with FIG. 7.

Switch 102 distributes mapping 810 to a respective managed switch of switch group 100 via a distributed commit. Upon receiving mapping 810, a respective switch stores it in the local persistent storage. Suppose that switch 802 is coupled to switches 101 and 102. In some embodiments, when switch 802 powers up and detects the new links, switch 802 initiates a link discovery protocol (e.g., Brocade Link Discovery Protocol (BLDP)). Switch 802 then sends a control message via the detected links. This control message can be referred to as a default mode message, which comprises switch MAC address 834 and an indicator indicating that switch 802 is in a default mode. In some embodiments, examples of this indicator include, but are not limited to, a default value of a switch group identifier, a default value of a switch identifier, a default value of a MAC address, an indicator variable (e.g., a flag), and a combination thereof.

Switches 101 and 102 receive this control message, determine switch 802 to be a bare-bone switch, and obtain switch group identifier 836 and switch identifier 838 from locally stored mapping 810 based on switch MAC address 834. Switches 101 and 102 can search a table in their respective local persistent storage with switch MAC address 834 as the search key to obtain switch group identifier 836 and switch identifier 838. Switches 101 and 102 then send a pre-configuration message comprising switch group identifier 836 and switch identifier 838 to switch 802. Upon receiving the pre-configuration messages, switch 802 determines that both messages are from the same switch group based on switch group identifier 836, selects one of the messages, and discards the other one. Switch 802 can select the message based on a priority value (e.g., a value which can indicate a primary switch) or the value of the switch identifier of the source switch (e.g., the lowest or highest value among switch identifiers of switches 101 and 102).

Suppose that switch 802 selects the pre-configuration message from switch 102, and extracts switch group identifier 836 and switch identifier 838 from the message. Switch 802 configures itself with the received identifiers and reboots. This configuration process includes assigning the identifiers to the local switch. When a current switch of a switch group detects a new switch which is not in a default mode, the current switch checks whether the new switch has a switch group identifier of the switch group, and if so, initiates the joining process for the new switch to be a new member switch of the switch group. After the reboot, switch 802 is now configured with switch group identifier 836 and not in a default mode. Hence, switch 802 can initiate the joining process to switch group 100 and sends a pre-invite message comprising switch group identifier 836 to switch 102. Upon receiving the pre-invite message, switch 102 identifies switch group identifier 836 and initiates the joining process for switch 802 to be a new member switch of switch group 100. It should be noted that switch 102 also sends a pre-invite message during the joining process.

If the user wants to retain control over how a switch identifier is assigned to switch 802, the user can provide switch identifier 838 to principal switch 102. The user can create mapping 810 between switch MAC address 834 and switch identifier 838, and provide mapping 810 to any of the switches of switch group 100, such as switch 101. Switch 101, in turn, provides mapping 810 to principal switch 102. Principal switch 102 then performs a distributed commit for mapping 810 in switch group 100. In this way, a respective switch of switch group 100 receives mapping 810 and stores mapping 810 in the local persistent storage. For example, switch 101 stores mapping 810 in database 640, as described in conjunction with FIG. 6A. It should be noted that this distributed commit may not include applying to the switch modules of a switch.

Figure 8B:
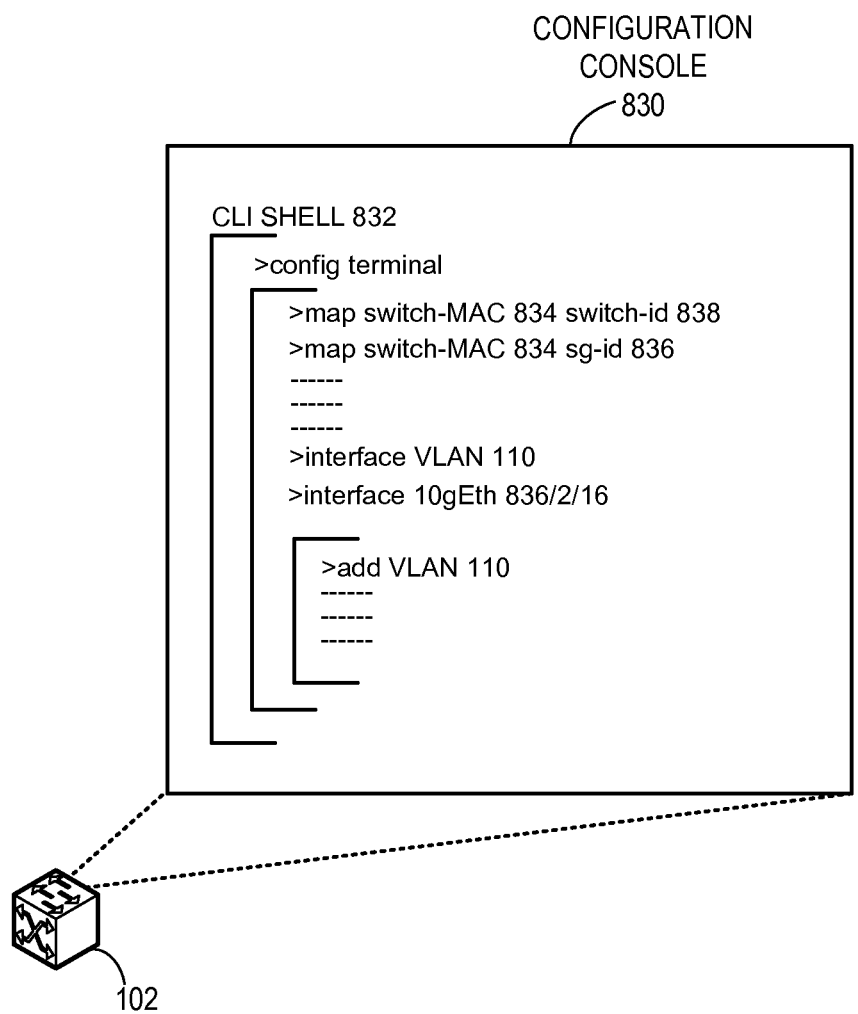
FIG. 8B illustrates an exemplary console for pre-configuring identifiers for a new switch of a switch group, in accordance with an embodiment of the present invention.

The user can provide mapping 810 to any of the switches of switch group 100 via a console of that switch. Suppose that the user provides mapping 810 to principal switch 102. FIG. 8B illustrates an exemplary console for pre-configuring identifiers for a new switch of a switch group, in accordance with an embodiment of the present invention. In this example, switch 102 has a console 830. Upon accessing, switch 102 presents console 830 to the user. In some embodiments, when the user accesses switch 102, console 830 provides a command line interface shell 832 to the user. The user can type commands to shell 832. Shell 832 can be the initial screen which appears when the user accesses switch 102. The user can provide a command (e.g., "config terminal") to shell 832 to gain access to a configuration terminal in shell 832.

The user can use this configuration terminal to provide a mapping between a switch MAC address and a corresponding switch identifier. For example, the user can enter a command (e.g., "map") to create a mapping between switch MAC address 834 and switch identifier 838. Additionally, the user can enter the command to create a mapping between switch MAC address 834 and switch group identifier 836. Similarly, the user can use this configuration terminal to provide global configuration associated with switch group 100 and local configuration associated with any switch in switch group 100. For example, the user can issue a command to the terminal to create a VLAN 110. This VLAN 110 is created across switch group 100, and hence, is part of the global configuration.

On the other hand, user can also issue a command to configure a specific port of a specific switch in switch group 100. This port configuration is a local configuration for that switch. In some embodiments, a port is identified by a port identifier, which can be in a "switch identifier/chassis number (e.g., line card number)/port number" format. For example, the user can configure a 10 Gigabit Ethernet port identified by port identifier "836/2/16." Since switch 802 is associated with switch identifier 836, the port identifier indicates that the port is port number 16 in line card number 2 of switch 101. The user can add VLAN 110 to that specific port. This VLAN configuration of the port is a local configuration of switch 802. Here, VLAN 110 can be the additional configuration information for new switch 802. When switch 802 joins switch group 100, this additional configuration information can be provided to switch 802 along with switch identifier 838.

Identifier Assignment

Figure 9:
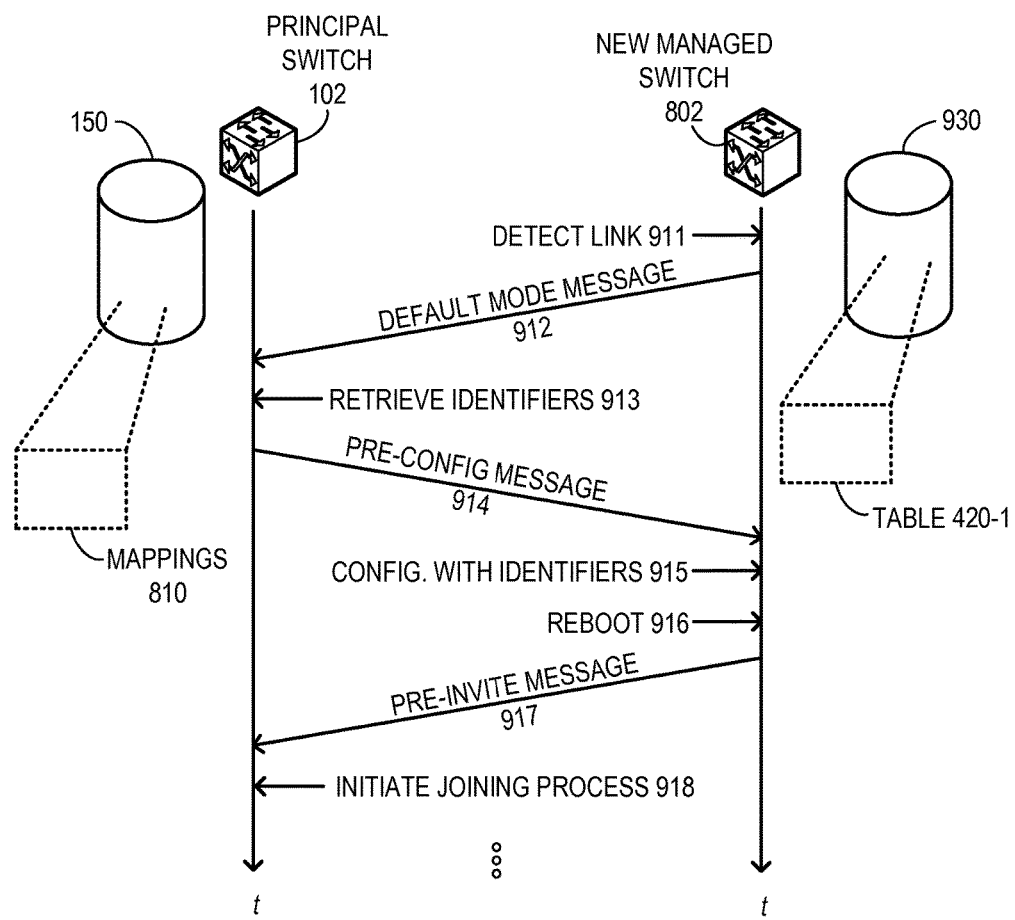
FIG. 9 illustrates an exemplary identifier assignment process of a new switch joining a switch group, in accordance with an embodiment of the present invention.

As described in the example in FIG. 8A, switch 802, which is a bare-bone switch, is coupled to switch 101 and 102. Hence, switch 802 can obtain its identifiers from either switch 101 or 102. Suppose that switch 102 provides the identifiers to switch 802. FIG. 9 illustrates an exemplary identifier assignment process of a new switch joining a switch group, in accordance with an embodiment of the present invention. During operation, switch 802 detects its link with switch 102 (operation 911). Switch 802 can initiate a link discovery protocol (e.g., BLDP) to detect the link with switch 102. Switch 802 then sends a "default mode" control message which indicates that switch 802 is a switch in a default mode (e.g., a bare-bone switch) (operation 912). This default mode message comprises switch MAC address 834 of switch 802 and an indicator indicating that switch 802 is in a default mode. In some embodiments, examples of this indicator include, but are not limited to, a default value of a switch group identifier, a default value of a switch identifier, a default value of a MAC address, an indicator value, and a combination thereof.

Switch 102 receives this default mode message, determines switch 802 to be a switch in a default mode, and retrieves switch group identifier 836 and switch identifier 838 from locally stored mapping 810 from local database 150 (operation 913). Switch 102 searches database 150 (e.g., in a table storing mapping 810) using switch MAC address 834 to retrieve the identifiers. Switch 102 then sends a pre-configuration message comprising switch group identifier 836 and switch identifier 838 to switch 802 (operation 914). Upon receiving the pre-configuration message, switch 802 extracts switch group identifier 836 and switch identifier 838 from the message, and configures itself with the received identifiers (operation 915). Switch 802 can store switch identifier 838 in table 420-1, which can be an instance of table 420 of FIG. 4C, in its local object relational database 930. Switch identifier 838 can correspond to NodeID of table 420.

In some embodiments, switch 802 reboots (operation 916) to ensure that the configurations take effect. At this point, switch 802 has been configured and is not in a default mode (i.e., not a bare-bone switch). After the reboot, switch 802 is ready for joining switch group 100 and sends a pre-invite message comprising switch group identifier 836 to switch 102 (and switch 101). When switch 102 (or switch 101) receives the pre-invite message from switch 802, switch 102 checks whether switch 802 has a switch group identifier of switch group 100. Since switch 802 is now configured with switch group identifier 836, switch 102 initiates the joining process for switch 802 to be a new member switch of switch group 100 (operation 918). It should be noted that, during the joining process, switch 102 (or 101) can also send a pre-invite message. Joining a switch group, such as a fabric switch, is described in U.S. patent application Ser. No. 13/092,724, titled "Fabric formation for virtual cluster switching," by inventors Shiv Haris and Phanidhar Koganti, filed 22 Apr. 2011, the disclosure of which is incorporated by reference herein.

Operations

Figure 10A:
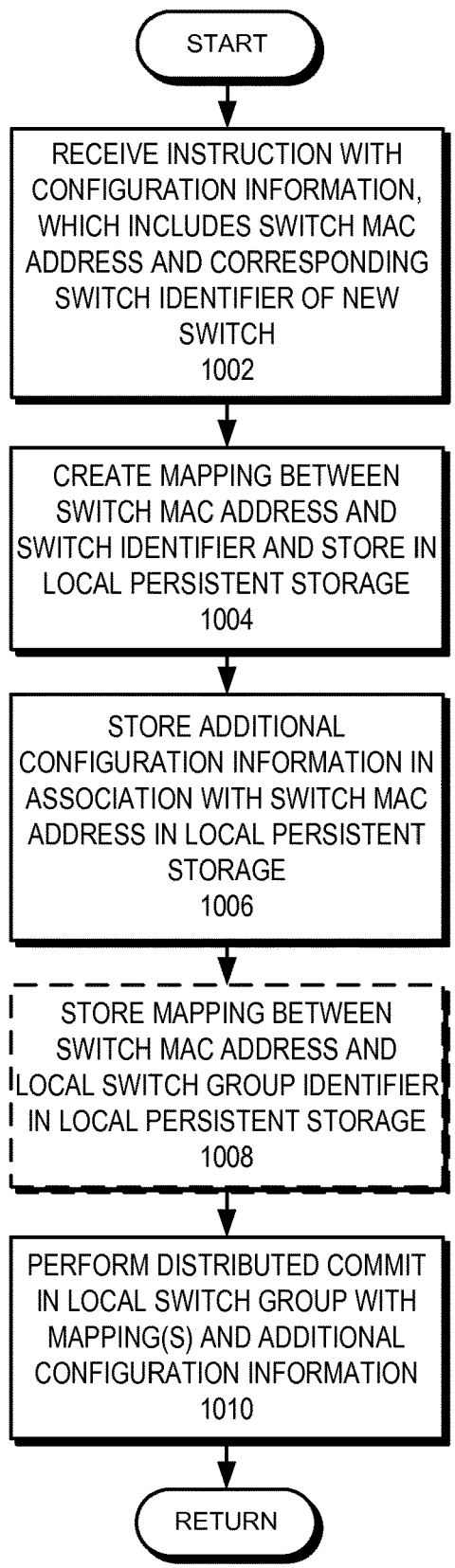
FIG. 10A presents a flowchart illustrating the process of a principal switch pre-configuring identifiers for a new switch, in accordance with an embodiment of the present invention.

FIG. 10A presents a flowchart illustrating the process of a principal switch pre-configuring identifiers for a new switch, in accordance with an embodiment of the present invention. During operation, the switch receives an instruction with configuration information, which includes a switch MAC address and a corresponding switch identifier of a new switch (operation 1002). The switch can receive the instruction from a user or from another switch, as described in conjunction with FIG. 6B. The switch then creates a mapping between the switch MAC address and the switch identifier, and stores the mapping in the local persistent storage (e.g., in an entry in a local database) (operation 1004).

In some embodiments, the switch can store additional configuration information in association with the switch MAC address in the local persistent storage (e.g., in the same entry) (operation 1006). For example, this additional configuration information can include VLAN configuration for the new switch. The switch can, optionally, store a mapping between the switch MAC address and a local switch group identifier in the local persistent storage (operation 1008). This local switch group identifier identifies the switch group of which the switch is a principal switch. It should be noted that this switch group identifier is associated with a respective switch of the switch group. The switch then performs a distributed commit in the local switch group with the mapping(s) and the additional configuration information (operation 1010), as described in conjunction with FIG. 11A.

Figure 10B:
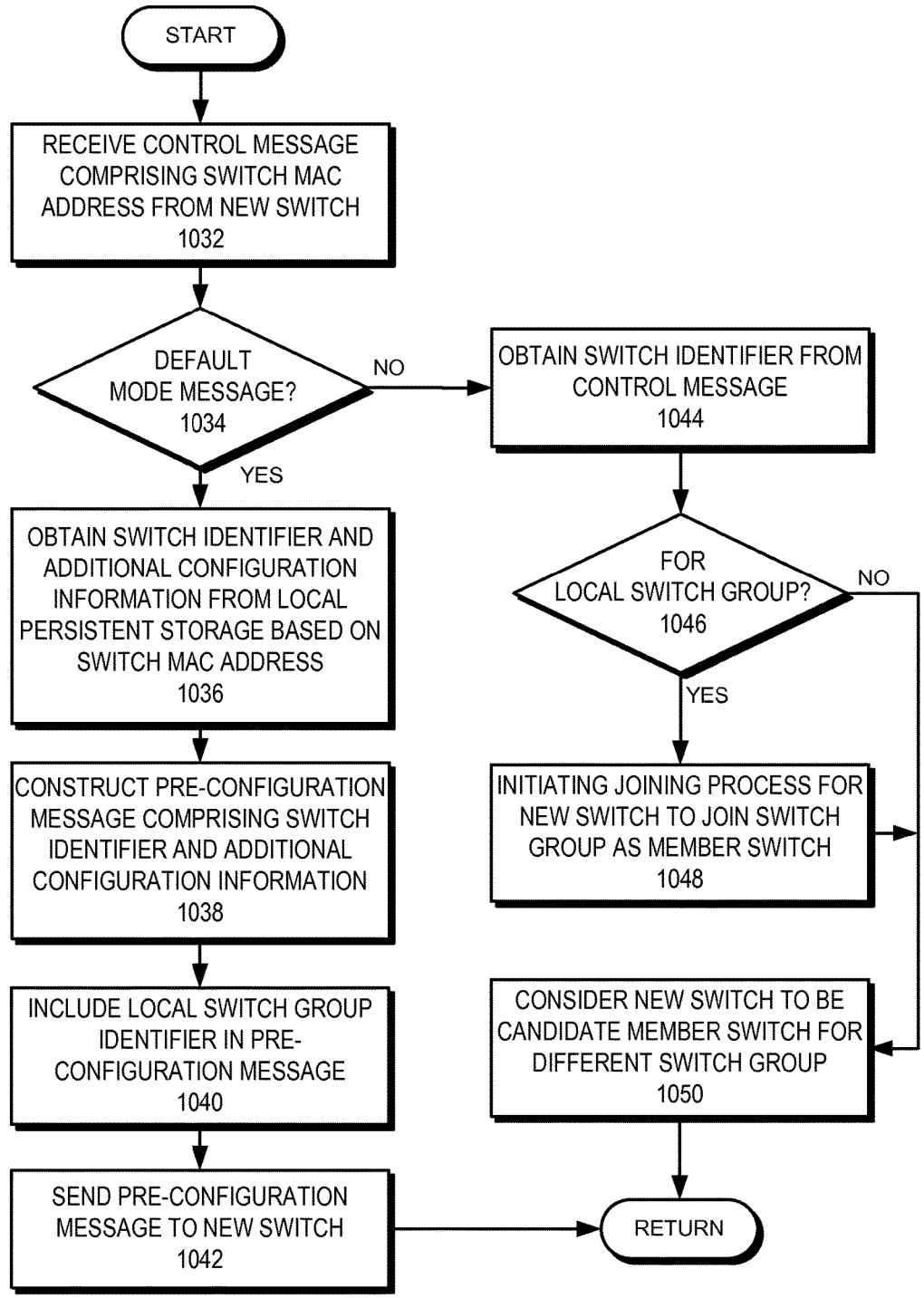
FIG. 10B presents a flowchart illustrating the process of a switch of a switch group managing identifier assignment for a new switch, in accordance with an embodiment of the present invention.

FIG. 10B presents a flowchart illustrating the process of a switch of a switch group managing identifier assignment for a new switch, in accordance with an embodiment of the present invention. This switch can be a principal or a managed switch. During operation, the switch receives a control message comprising a switch MAC address from a new switch (operation 1032). The switch then checks whether the control message is a default mode message (operation 1034). The default mode message is a control message sent from a new switch indicating that the new switch is in a default mode. The control message can include an indicator which indicates whether the message is a default mode message (i.e., the new switch is in a default mode).

If the control message is a default mode message, the switch obtains the switch identifier and the additional configuration information from the local persistent storage based on the switch MAC address (operation 1036). The switch then constructs a pre-configuration message comprising the switch identifier and the additional information (operation 1038), includes the local switch group identifier in the pre-configuration message (operation 1040), and sends the pre-configuration message to the new switch (i.e., the switch in the default mode) (operation 1042). Sending a message includes identifying one or more egress ports associated with the destination address of the message and transmitting the message via the identified port(s).

If the control message is not a default mode message, the control message can be a pre-invite message from the new switch, as described in conjunction with FIG. 9. The switch then obtains a switch identifier from the control message (operation 1044) and checks whether the control message is for the local switch group (operation 1046). In some embodiments, if the control message includes a switch group identifier of the local switch group, the switch considers the control message to be for the local switch group. If the control message is for the local switch group, the switch initiates the joining process for the new switch to join the switch group as a member switch (operation 1048). If the control message is not for the local switch group, the switch considers the new switch to be a candidate member switch for a different switch group (operation 1050).

Figure 10C:
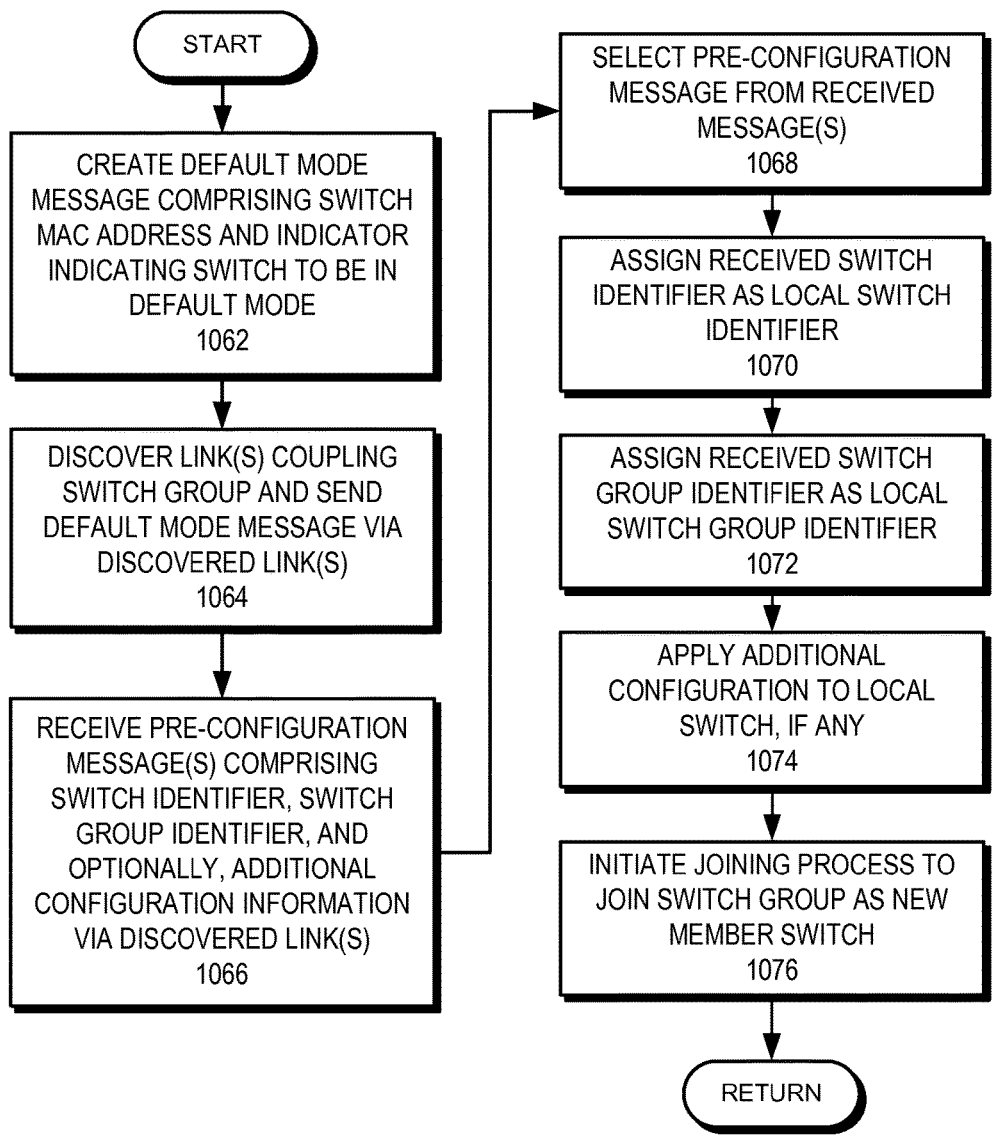
FIG. 10C presents a flowchart illustrating the process of a new switch managing identifiers associated with a switch group, in accordance with an embodiment of the present invention.

FIG. 10C presents a flowchart illustrating the process of a new switch managing identifiers associated with a switch group, in accordance with an embodiment of the present invention. During operation, the switch creates a default mode message comprising the switch MAC address of the switch and an indicator indicating that the switch is in a default mode (operation 1062). The switch discovers the link(s) coupling the switch to the switch group (i.e., the new inter-switch link(s) of the switch group) and sends the default mode message via the discovered link(s) (operation 1064). The switch then receives pre-configuration message(s) comprising a switch identifier, a switch group identifier, and, optionally, additional configuration information, via the discovered link(s) (operation 1066).

The switch then selects a pre-configuration message from the received messages (operation 1068), as described in conjunction with FIG. 8A. The switch assigns the received switch identifier as the local switch identifier (operation 1070) and the received switch group identifier as the local switch group identifier (operation 1072). The switch also applies the additional configuration information to the local switch, if any (operation 1074). The switch then initiates the joining process to join the switch group as a new member switch (operation 1076).

Distributed Commit

Figure 11A:
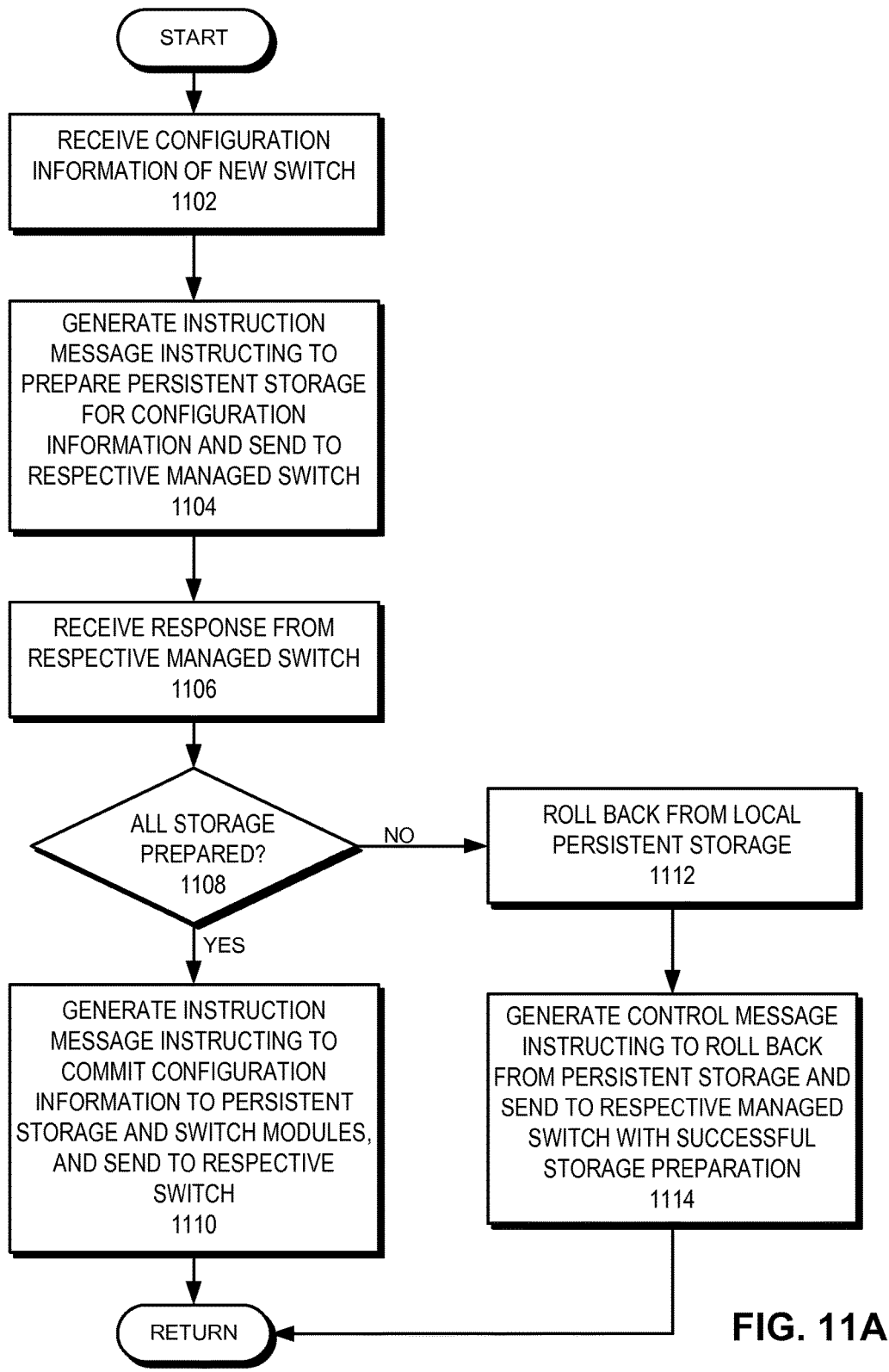
FIG. 11A presents a flowchart illustrating the distributed commit process of a principal switch applying configuration information, in accordance with an embodiment of the present invention.

FIG. 11A presents a flowchart illustrating the distributed commit process of a principal switch applying configuration information, in accordance with an embodiment of the present invention. During operation, the switch receives configuration information of a new switch (operation 1102). In some embodiments, this configuration information includes the switch identifier to be assigned to the new switch. The switch then generates and sends an instruction message to a respective managed switch instructing to prepare their local persistent storage for the configuration information (operation 1104). The switch receives a response from a respective managed switch (operation 1106) and checks whether all persistent storages have been prepared (operation 1108). If all persistent storages have not been prepared, the switch rolls back the configuration information from the local persistent storage (operation 1112).

The switch also generates a control message instructing to roll back the configuration information from the persistent storage and sends the message to a respective managed switch with successful storage preparation (operation 1114) (e.g., the switch may not send the control message to the managed frameworks which have not succeeded in preparing their corresponding local persistent storage). If all persistent storages have been prepared, the switch generates a control message instructing to commit the configuration information to the persistent storage (and the switch modules), and sends the message to a respective switch (operation 1110).

Figure 11B:
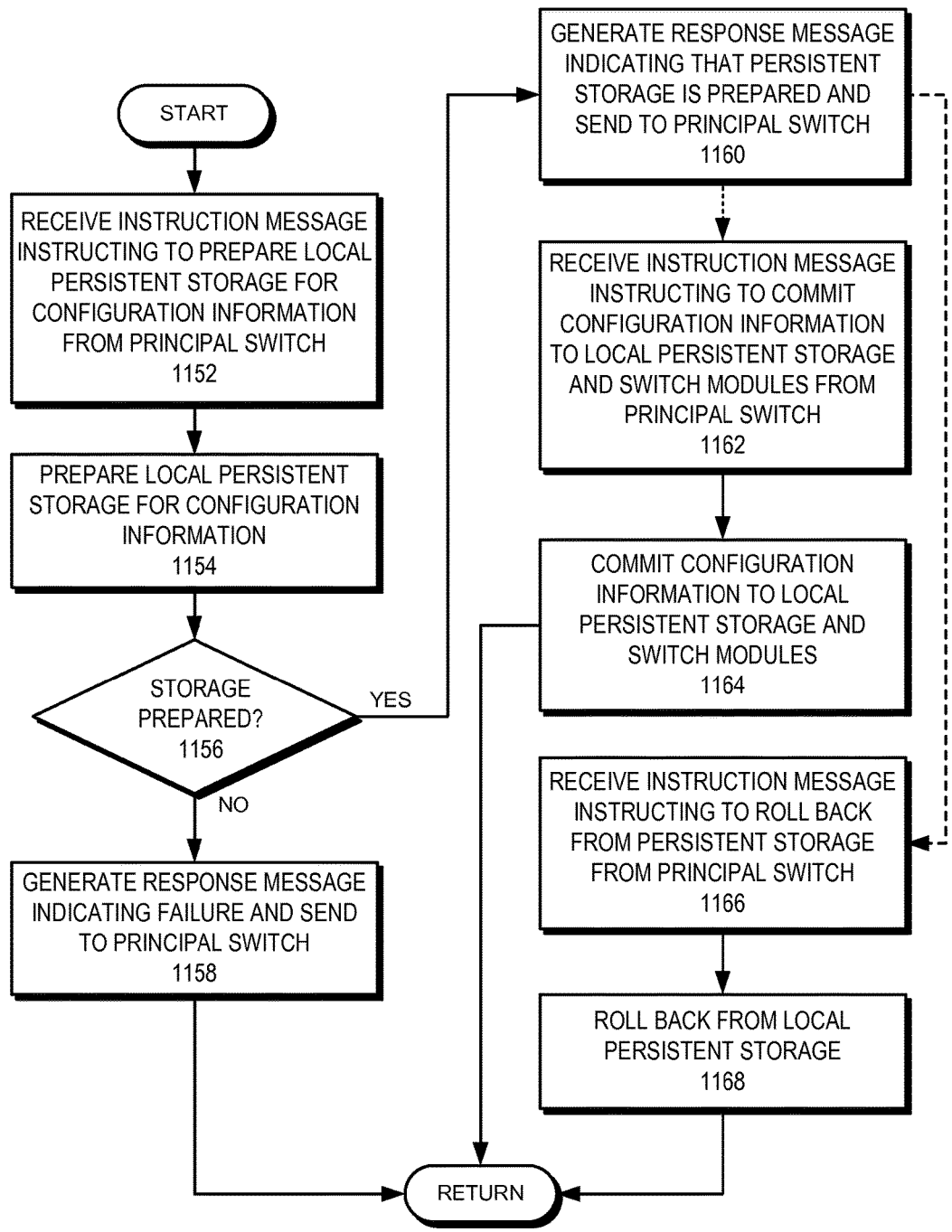
FIG. 11B presents a flowchart illustrating the distributed commit process of a managed switch applying configuration information received from a principal switch, in accordance with an embodiment of the present invention.

FIG. 11B presents a flowchart illustrating the distributed commit process of a managed switch applying configuration information received from a principal switch, in accordance with an embodiment of the present invention. During operation, the switch receives an instruction message from a principal switch instructing to prepare the local persistent storage for the configuration information (operation 1152) and prepares the local persistent storage for the configuration information (operation 1154). The switch then checks whether the local persistent storage has been prepared (operation 1156). If prepared, the switch generates a response message indicating that the local persistent storage has been prepared for the configuration information and sends the message to the principal switch (operation 1160).

Depending on whether other managed switches have succeeded or not, the switch may or may not commit the configuration information. If all other managed switches have succeeded (denoted with a dotted arrow), the switch receives an instruction message from the principal switch instructing to commit the configuration information to the local persistent storage (and the switch modules) (operation 1162) and commits the configuration information to the local persistent storage (and the switch modules) (operation 1164). It should be noted that the instruction for the managed switches is for committing the configuration information to the persistent storage and the switch modules, whereas the instruction for the managed multi-fabric managers can be for committing to the persistent storage. For example, if a managed multi-fabric manager is a switch in a switch group, configuration information of the switch group is committed to the switch modules as well.

If at least one other managed switch has not succeeded (denoted with a dashed arrow), the switch receives an instruction message from the principal switch instructing to roll back the configuration information from the local persistent storage (operation 1166) and rolls back the configuration information from the local persistent storage (operation 1168). If the local persistent storage has not been prepared, the switch generates a response message indicating a failure and sends the message to the principal switch (operation 1158).

Exemplary Switch

Figure 12:
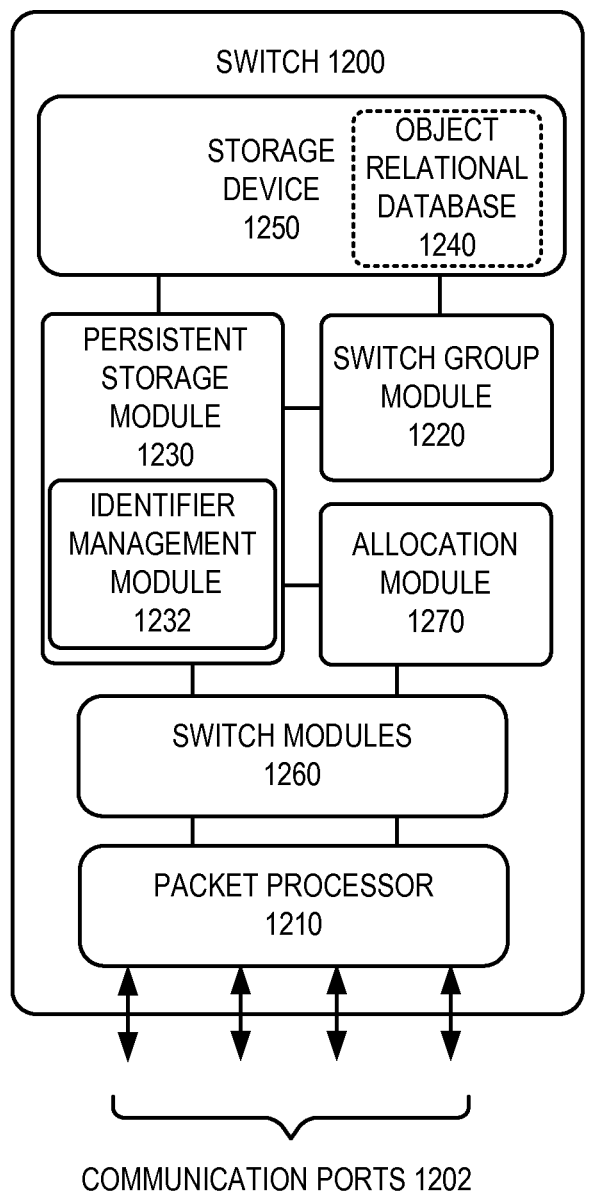
FIG. 12 illustrates an exemplary switch with automatic identifier assignment support, in accordance with an embodiment of the present invention.

FIG. 12 illustrates an exemplary switch with automatic identifier assignment support, in accordance with an embodiment of the present invention. In this example, a switch 1200 operates as a multi-fabric manager. Switch 1200 includes a number of communication ports 1202, a packet processor 1210, a persistent storage module 1230, an allocation module 1270, and a storage device 1250. Switch 1200 can also include switch modules 1260 (e.g., processing hardware of switch 1200, such as its ASIC chips), which includes information based on which switch 1200 processes packets (e.g., determines output ports for packets). Packet processor 1210 extracts and processes header information from the received frames. Packet processor 1210 can identify a switch identifier associated with the switch in header of a packet.

In some embodiments, switch 1200 maintains a membership in a switch group, which can be a fabric switch, as described in conjunction with FIG. 1. Switch 1200 then includes a switch group module 1220. Switch group module 1220 maintains a configuration database in storage device 1250 that maintains the configuration state of every switch within the fabric switch. Switch group module 1220 maintains the state of the fabric switch, which is used to join other switches. Persistent storage module 1230 stores configuration information associated with the switch group in a data structure in an object relational database 1240 in storage device 1250.

Communication ports 1202 can include inter-switch communication channels for communication within the fabric switch. This inter-switch communication channel can be implemented via a regular communication port and based on any open or proprietary format. Communication ports 1202 can also include one or more extension communication ports for communication between neighbor fabric switches. Communication ports 1202 can include one or more TRILL ports capable of receiving frames encapsulated in a TRILL header. Communication ports 1202 can also include one or more IP ports capable of receiving IP packets. An IP port is capable of receiving an IP packet and can be configured with an IP address. Packet processor 1210 can process TRILL-encapsulated frames and/or IP packets.

During operation, allocation module 1270 determines that a second switch is in a default mode and obtains a switch identifier from the persistent storage based on a switch MAC address of the second switch. Allocation module 1270 then constructs a control message, which is destined for the second switch and includes the switch identifier and a switch group identifier of the switch group. Allocation module 1270 can identify the switch MAC address from a default mode message from the second switch.

In some embodiments, switch 1200 also includes an identifier management module 1232, which maintains a first mapping between the switch MAC address and the switch identifier in the persistent storage. Identifier management module 1232 can also maintain a second mapping between the switch MAC address and the switch group identifier. Identifier management module 1232 creates the first mapping based on one or more of: (i) a user input and (ii) a notification message from another member switch of the switch group.

Note that the above-mentioned modules can be implemented in hardware as well as in software. In one embodiment, these modules can be embodied in computer-executable instructions stored in a memory which is coupled to one or more processors in switch 1200. When executed, these instructions cause the processor(s) to perform the aforementioned functions.

In summary, embodiments of the present invention provide a switch and a method for assigning a switch identifier to a new switch. In one embodiment, the switch includes a switch group module, a persistent storage module, and an allocation module. The switch group module maintains a membership in a switch group. The switch group includes a plurality of switches and operates as a single switch. The persistent storage module stores configuration information associated with the switch group in a data structure in a local persistent storage. The allocation module determines that a second switch is in a default mode and obtains a switch identifier from the persistent storage based on a switch media access control (MAC) address of the second switch. The allocation module then constructs a control message, which is destined for the second switch and includes the switch identifier and a switch group identifier of the switch group.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
fabric circuitry configured to maintain a membership in a network of interconnected switches identified by a fabric identifier, which is assigned to the switch;
persistent storage circuitry configured to store configuration information associated with the network of interconnected switches in a database table of an object relational database constructed based on an object-oriented language and stored in a persistent storage of the switch, wherein a respective database table of the object relational database corresponds to a class, which is defined in the object-oriented language and associated with the switch; and
allocation circuitry configured to:
determine that a second switch is in a default mode indicating that the second switch is not a part of the network of interconnected switches;
in response to determining that the second switch is in the default mode, obtain a switch identifier by looking up in the database table in the object relational database using a media access control (MAC) address of the second switch, wherein the switch identifier is for identifying the second switch in the network of interconnected switches;
construct, prior to the second switch joining the network of interconnected switches, a control message that comprises the switch identifier and the fabric identifier, and is destined to the second switch; and
determine, for the control message, an egress port of the switch corresponding to the second switch.

2. The switch of claim 1, further comprising identifier management circuitry configured to maintain a first mapping between the MAC address and the switch identifier in the database table of the object relational database.

3. The switch of claim 2, wherein the identifier management circuitry is further configured to generate the first mapping in the database table based on one or more of: a user input, and a notification message from another member switch of the network of interconnected switches.

4. The switch of claim 2, wherein the identifier management circuitry is further configured to maintain a second mapping between the MAC address and the fabric identifier in a second database table in the object relational database.

5. The switch of claim 1, wherein the allocation circuitry is further configured to determine that the second switch is in the default mode by identifying the MAC address from a notification message from the second switch, wherein the notification message comprises an indicator indicating that the second switch is in the default mode.

6. The switch of claim 5, wherein the indicator is one or more of: a default value of a fabric identifier, a default value of a switch identifier, a default MAC address, and an indicator variable.

7. The switch of claim 1, wherein the control message further comprises a virtual local area network (VLAN) configuration.

8. The switch of claim 1, wherein the switch identifier is one or more of: a Transparent Interconnection of Lots of Links (TRILL) routing bridge (RBridge) identifier, an Internet Protocol (IP) address, and a MAC address.

9. The switch of claim 1, wherein values can be retrieved from the persistent storage in response to a power cycle of the switch without runtime structuring in a memory of the switch.

10. The switch of claim 1, wherein the fabric identifier is assigned to a respective member of the network of interconnected switches.

11. A method, comprising:
maintaining a membership of a first switch in a network of interconnected switches identified by a fabric identifier, which is assigned to the first switch;
storing configuration information associated with the network of interconnected switches in a database table of an object relational database constructed based on an object-oriented language and stored in a persistent storage of the first switch, wherein a respective database table of the object relational database corresponds to a class, which is defined in the object-oriented language and associated with the first switch;
determining that a second switch is in a default mode indicating that the second switch is not a part of the network of interconnected switches;
in response to determining that the second switch is in the default mode, obtaining a switch identifier by looking up in the database table in the object relational database using a media access control (MAC) address of the second switch, wherein the switch identifier is for identifying the second switch in the network of interconnected switches;
constructing, prior to the second switch joining the network of interconnected switches, a control message that comprises the switch identifier and the fabric identifier, and is destined to the second switch; and
determining, for the control message, an egress port of the first switch corresponding to the second switch.

12. The method of claim 11, further comprising maintaining a first mapping between the MAC address and the switch identifier in the database table of the object relational database.

13. The method of claim 12, further comprising generating the first mapping in the database table based on one or more of: a user input and a notification message from another member switch of the network of interconnected switches.

14. The method of claim 12, further comprising maintaining a second mapping between the MAC address and the fabric identifier in a second database table of the object relational database.

15. The method of claim 11, wherein determining that the second switch is in the default mode comprises identifying the MAC address from a notification message from the second switch, wherein the notification message comprises an indicator indicating that the second switch is in the default mode.

16. The method claim 15, wherein the indicator is one or more of: a default value of a fabric identifier, a default value of a switch identifier, a default MAC address, and an indicator variable.

17. The method of claim 11, wherein the control message further comprises a virtual local area network (VLAN) configuration.

18. The method of claim 11, wherein the switch identifier is one or more of: a Transparent Interconnection of Lots of Links (TRILL) routing bridge (RBridge) identifier, an Internet Protocol (IP) address, and a MAC address.

19. The method of claim 11, wherein values can be retrieved from the persistent storage in response to a power cycle of the first switch without runtime structuring in a memory of the first switch.

20. The method of claim 11, wherein the fabric identifier is assigned to a respective member of the network of interconnected switches.

21. A non-transitory computer-readable storage medium storing instructions that when executed by a computing system cause the computing system to perform a method for assigning a switch identifier to a new switch, the method comprising:

maintaining a membership of a first switch in a network of interconnected switches identified by a fabric identifier, which is assigned to the first switch;

storing configuration information associated with the network of interconnected switches in a database table of an object relational database constructed based on an object-oriented language and stored in a persistent storage of the first switch, wherein a respective database table of the object relational database corresponds to a class, which is defined in the object-oriented language and associated with the first switch;

determining that a second switch is in a default mode indicating that the second switch is not part of the network of interconnected switches;

in response to determining that the second switch is in the default mode, obtaining a switch identifier by looking up in the database table in the object relational database using a media access control (MAC) address of the second switch, wherein the switch identifier is for identifying the second switch in the network of interconnected switches;

constructing, prior to the second switch joining the network of interconnected switches, a control message that comprises the switch identifier and the fabric identifier, and is destined to the second switch; and determining, for the control message, an egress port of the first switch corresponding to the second switch.

\* \* \* \* \*